United States Patent
Wang et al.

(10) Patent No.: US 12,470,647 B2
(45) Date of Patent: Nov. 11, 2025

(54) BRACKET, MODULE ASSEMBLY, AND ELECTRONIC DEVICE

(71) Applicant: Honor Device Co., Ltd., Shenzhen (CN)

(72) Inventors: Xuyang Wang, Shenzhen (CN); Wenxing Yao, Shenzhen (CN); Fenying Li, Shenzhen (CN); Tianye Liu, Shenzhen (CN); Yiwei Hou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/245,983

(22) PCT Filed: Aug. 26, 2022

(86) PCT No.: PCT/CN2022/115067
§ 371 (c)(1),
(2) Date: Mar. 20, 2023

(87) PCT Pub. No.: WO2023/116014
PCT Pub. Date: Jun. 29, 2023

(65) Prior Publication Data
US 2024/0129395 A1    Apr. 18, 2024

(30) Foreign Application Priority Data

Dec. 20, 2021 (CN) .......................... 202111562886.5
Mar. 1, 2022 (CN) .......................... 202210197522.X

(51) Int. Cl.
*H04M 1/00* (2006.01)
*H04M 1/02* (2006.01)

(52) U.S. Cl.
CPC .................................. *H04M 1/026* (2013.01)

(58) Field of Classification Search
CPC .... H04M 1/026; G06F 1/1658; G06F 1/1698; G06F 1/203; H01Q 1/12; H01Q 1/243; H05K 7/2039
See application file for complete search history.

(56) References Cited

U.S. PATENT DOCUMENTS 10,320,961 B2    6/2019  Wei et al.
2018/0176346 A1*  6/2018  Wei ..................... H04M 1/0249
(Continued)

FOREIGN PATENT DOCUMENTS

| CN | 102176577 A | 9/2011 |
| CN | 203149250 U | 8/2013 |

(Continued)

*Primary Examiner* — Pakee Fang
(74) *Attorney, Agent, or Firm* — Conley Rose, P.C.

(57) ABSTRACT

A bracket, a module assembly, and an electronic device, so as to improve position stability of the module in the electronic device. Two first limiting parts arranged opposite to each other are arranged at two ends of the bracket, a second limiting part is arranged on at least one side of the bracket, and the two first limiting parts and the second limiting part are enclosed to form a mounting position for mounting the module. Both the first limiting parts and the second limiting part may limit the module, so as to limit in all directions and ensure position stability of the module in the bracket. The bracket is further fixed to the electronic device through fixing parts, so that the position stability of the module in the electronic device may be improved.

20 Claims, 20 Drawing Sheets

(56) References Cited

U.S. PATENT DOCUMENTS

| | | | |
|---|---|---|---|
| 2019/0384365 A1* | 12/2019 | Hsu | G06F 1/1613 |
| 2021/0006645 A1* | 1/2021 | Zeng | H04M 1/0264 |
| 2022/0223073 A1* | 7/2022 | Wang | G09F 9/33 |
| 2023/0070431 A1* | 3/2023 | Li | G06F 1/1652 |
| 2023/0403350 A1* | 12/2023 | Guo | G06F 1/1637 |

FOREIGN PATENT DOCUMENTS

| | | |
|---|---|---|
| CN | 106534417 A | 3/2017 |
| CN | 106850883 A | 6/2017 |
| CN | 108232499 A | 6/2018 |
| CN | 108600437 A | 9/2018 |
| CN | 108712533 A | 10/2018 |
| CN | 208113171 U | 11/2018 |
| CN | 109884816 A | 6/2019 |
| CN | 110299606 A | 10/2019 |
| CN | 112162594 A | 1/2021 |
| CN | 112382845 A | 2/2021 |
| CN | 113889357 A | 1/2022 |
| WO | 2021196694 A1 | 10/2021 |

* cited by examiner

BRACKET, MODULE ASSEMBLY, AND ELECTRONIC DEVICE

CROSS-REFERENCE TO RELATED APPLICATIONS

This application is a national stage of International Application No. PCT/CN2022/115067, filed on Aug. 26, 2022, which claims priority to Chinese Patent Application No. 202111562886.5, filed with the China National Intellectual Property Administration on Dec. 20, 2021, and Chinese Patent Application No. 202210197522.X, filed with the China National Intellectual Property Administration on Mar. 1, 2022, all of which are incorporated herein by reference in their entireties.

TECHNICAL FIELD

This application relates to the field of electronic technologies, and in particular, to a bracket, a module assembly, and an electronic device.

BACKGROUND

With the continuous development of communication technology, users' requirements for communication performance of electronic devices are increasingly higher. To meet use requirements of the users for electronic device communication in different occasions and scenarios, some modules with special communication performance, such as a millimeter wave module, may be incorporated into electronic products such as mobile phones. The main function of such a module is to realize signal transmission in a millimeter wave band.

Current millimeter wave modules are usually packaged devices, including a circuit board, a chip, an antenna module, and a BTB (Board to Board) connector, which are configured to connect to a circuit board in the mobile phone. After the millimeter wave module is mounted in the mobile phone, position stability and connection stability need to be maintained.

SUMMARY

Embodiments of this application provide a bracket, a module assembly, and an electronic device, which may mount a module more stably, to improve position stability of the module in the electronic device.

According to an aspect, an embodiment of this application provides a bracket for a module, two first limiting parts arranged opposite to each other are arranged at two ends of the bracket, a second limiting part is arranged on at least one side of the bracket, and the two first limiting parts and the second limiting part are enclosed to form a mounting position for mounting the module. Two first limiting parts at two ends and a second limiting part at least at one side are enclosed to form a mounting position, and both the first limiting parts and the second limiting part may limit the module, so as to limit in all directions and ensure position stability of the module in the bracket. The bracket is further fixed to the electronic device through fixing parts, so that the position stability of the module in the electronic device may be ensured.

According to an aspect, an embodiment of this application further provides a first implementation according to the aspect.

The bracket includes a bottom plate and vertical plates at two ends of the bottom plate, and the vertical plates form the first limiting parts; and a first flange is arranged on only one side of the bottom plate, and the first flange forms the second limiting part. A bottom plate is further arranged while two first limiting parts and one second limiting part are arranged, and the bottom plate may provide a better supporting role for the module, to further ensure mounting on the module in a limited manner.

According to the first implementation of the aspect, an embodiment of this application further provides a second implementation according to the aspect.

A second flange opposite to an extension direction of the first flange is arranged on the other side of the bottom plate, and the second flange is configured to bond a circuit board element and/or an electronic device. The second flange may bond the circuit board element and the electronic device, thereby facilitating fixing of the circuit board element and improving reliability of connection between the bracket and the electronic device.

According to the first implementation of the aspect, an embodiment of this application further provides a third implementation according to the aspect.

The bracket is made of copper alloy or carbon fiber. Copper alloy and carbon fiber have high strength, meet strength requirements, and have good heat dissipation performance, which is also beneficial to heat dissipation of the module in a case that heat dissipation is required, thereby improving user experience.

According to an aspect, an embodiment of this application further provides a fourth implementation according to the aspect.

The bracket includes two side plates arranged opposite to each other and two end plates arranged opposite to each other, the end plate is the first limiting part, and the side plate is the second limiting part; and the two side plates and the two end plates are enclosed to form the mounting position, and an inner wall of at least one of the side plate or the end plate is at least partially provided with an elastic part made of an elastic material in a protruding manner, so as to be in an interference fit with the module. The bracket is enclosed by two first limiting parts and two second limiting parts to form a mounting position, to limit the module more comprehensively in a circumferential direction, and limit is realized by interference pressing of the elastic part, so that limit is reliable and may not damage the module. The bottom of the bracket may also be empty by performing interference pressing, so that it is more convenient to mount the module, and the module assembly is not easy to float after mounting.

According to the fourth implementation of the aspect, an embodiment of this application further provides a fifth implementation according to the aspect.

The end plate and the side plate are integrally formed through injection molding, the elastic part is made of soft plastic, and other parts of the end plate and the side plate are made of hard plastic. Integrated injection molding is beneficial to ensuring integration of the bracket, and the elastic part is not prone to be separated from other parts. The soft plastic is beneficial to realizing interference pressing, and the hard plastic part is beneficial to ensuring the strength of the bracket. In addition, when the module has a signal transmission function, the plastic material has no or little influence on the function of the module.

According to an aspect and the first implementation to the fifth implementation of the aspect, an embodiment of this application further provides a sixth implementation according to the aspect.

The module includes an external connecting end, and the bracket is provided with a notch to expose the external connecting end. The notch is arranged to expose the external connecting end, so as to facilitate connection between the external connecting end and the external components, and avoid scratching the external connecting end or connected external components.

According to an aspect and the first implementation to the fifth implementation of the aspect, an embodiment of this application further provides a seventh implementation according to the aspect.

The bracket is separately arranged on the electronic device, and the bracket includes fixing parts, where the fixing parts are configured to fix the bracket to the electronic device; or the bracket is integrally formed on a housing of the electronic device. The bracket is integrally arranged on the housing of the electronic device, and there is no need to perform a fixing operation. Alternatively, the bracket is separately arranged in the electronic device, which is convenient to process.

According to the seventh implementation of the aspect, an embodiment of this application further provides an eighth implementation according to the aspect.

The bracket is separately arranged on the electronic device, the fixing parts are fixed or integrally arranged on the first limiting parts, and the fixing parts are provided with connecting holes configured for fixing to the electronic device. The fixing part is arranged on the first limiting part, that is, at two ends of the bracket, and connecting holes are provided, thereby facilitating implementation of a fastening operation.

According to a second aspect, an embodiment of this application further provides a module assembly, including a module and a bracket for mounting the module. The bracket is a bracket according to an aspect and the first implementation to the eighth implementation of the aspect, and the module is mounted at the mounting position of the bracket. The module assembly has the same technical effect as the bracket.

According to a second aspect, an embodiment of this application further provides a first implementation according to the second aspect.

The module includes an external connecting end, and the module assembly further includes a connection structure, where the connection structure includes a main body portion and a first connecting end and a second connecting end that are arranged on the main body portion, the first connecting end is configured to be connected to the external connecting end of the module 1, and the second connecting end is configured to connect an electronic element of the electronic device; and the main body portion is capable of being fixed to the second limiting part. The main body portion of the connection structure is fixed to the second limiting part, so that connection between the first connecting end and the second connecting end does not interfere with each other, and the connection reliability is higher.

According to the first implementation of the second aspect, an embodiment of this application further provides a second implementation according to the second aspect.

The main body portion is bonded to the second limiting part. Such a bonding manner is simple and may not damage the connection structure.

According to the second aspect and the first implementation and the second implementation of the second aspect, an embodiment of this application further provides a third implementation according to the second aspect.

At least one of a heat conductive pad or a circuit board element is fixed on the bottom of the module assembly. The heat conductive pad is arranged on the bottom of the module assembly, which can effectively improve the heat dissipation effect of the module assembly and improve the user experience. The heat conductive pad is arranged on the bottom of the module assembly, which may not be damaged during the mounting, thereby maintain the heat conduction performance. When the circuit board element is arranged on the bottom of the module assembly, the module assembly is simultaneously used as a mounting part of the circuit board element, thereby making full use of a space.

According to the third implementation of the second aspect, an embodiment of this application further provides a fourth implementation according to the second aspect.

A limiting structure is arranged on the bottom of the bracket, and the limiting structure prevents the circuit board element from being separated from the bottom. The circuit board element is limited by the limiting structure, which is beneficial to ensuring the position stability of the circuit board element in the electronic device.

According to the fourth implementation of the second aspect, an embodiment of this application further provides a fifth implementation according to the second aspect.

The limiting structure is a protrusion or concave part arranged on the bottom of the bracket, and the circuit board element includes a corresponding concave part or protrusion; or the limiting structure is a concave part arranged on the bottom of the bracket, and the circuit board element is capable of being embedded into the concave part. The limit is simple based on convex-concave coordination, and it is easy to realize limit and process the structure.

According to the second aspect and the first implementation and the second implementation of the second aspect, an embodiment of this application further provides a sixth implementation according to the second aspect.

A bottom plate is arranged on the bottom of the bracket, and the bottom of the module is bonded to the bottom plate. The module is bonded to the bottom plate, which may further improve the position stability of the module in the bracket.

According to the second aspect and the first implementation and the second implementation of the second aspect, an embodiment of this application further provides a seventh implementation according to the second aspect.

The module is bonded to at least one of the first limiting part or the second limiting part. The module is connected to the first limiting parts and the second limiting part, which may further improve the position stability of the module in the bracket.

According to the seventh implementation of the second aspect, an embodiment of this application further provides an eighth implementation according to the second aspect.

The module includes a chip, where the chip is bonded to the second limiting part. The chip may have a heat generating component bonded to the second limiting part, to accelerate heat dissipation.

According to the second aspect and the first implementation and the second implementation of the second aspect, an embodiment of this application further provides a ninth implementation according to the second aspect.

The module includes an antenna module capable of performing communication, the second limiting part is arranged on only one side of the bracket, the other side of the bracket is provided with an opening, and the antenna module faces the opening. The antenna module faces the opening, that is, the opening is in an external radiation region of the antenna module, so that the communication function of the antenna module may not be affected.

According to the second aspect and the first implementation to the ninth implementation of the second aspect, an embodiment of this application further provides a tenth implementation according to the second aspect.

The module is a millimeter wave module. The millimeter wave module may transmit signals in a millimeter wave band. By using the bracket in this embodiment, the millimeter wave module can be stably arranged in the electronic device to stably transmit signals.

According to a third aspect, an embodiment of this application further provides an electronic device including the module assembly according to the second aspect and any one of the first to tenth implementations of the second aspect. The electronic device has the same technical effect as the module assembly.

According to a third aspect, an embodiment of this application further provides a first implementation according to the third aspect.

The electronic device is a mobile phone, and the module assembly is arranged in a middle frame of the mobile phone. The module assembly is arranged in the middle frame, which can be fixed through the middle frame and is convenient to mount.

According to the first implementation of the third aspect, an embodiment of this application further provides a second implementation according to the third aspect.

A heat conductive pad is arranged between the bottom of the module assembly and a bottom wall of the middle frame. The heat conductive pad may guide heat of the module to the bottom wall of the middle frame as soon as possible, so as to achieve the purpose of dissipating heat to the outside.

DESCRIPTION OF EMBODIMENTS

Embodiment 1

Figure 1:
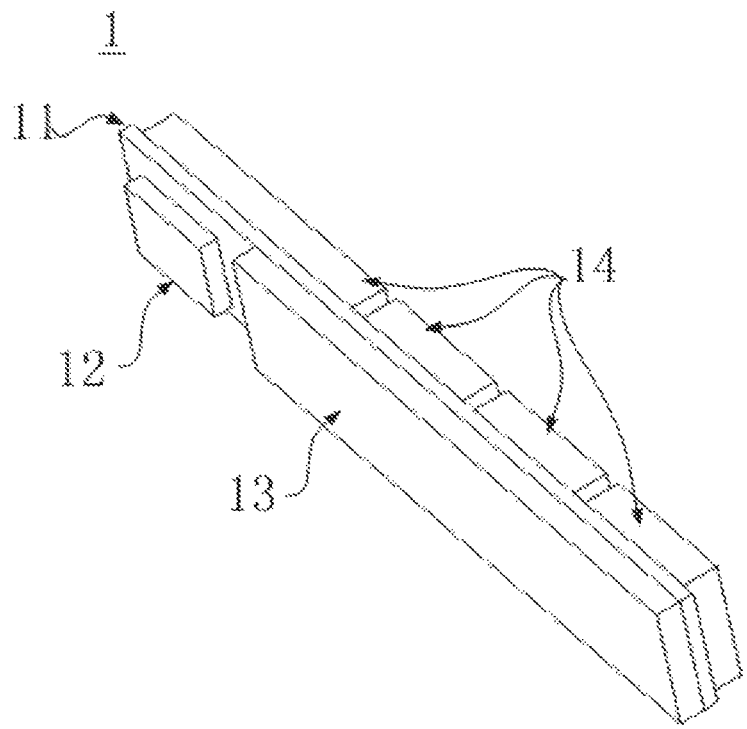
FIG. 1 is a schematic diagram of a module according to Embodiment 1 of this application.

Referring to FIG. 1, FIG. 1 is a schematic diagram of a module 1 according to Embodiment 1 of this application.

The module 1 in this embodiment of this application is specifically a millimeter wave module and is mainly configured to achieve signal transmission in a millimeter wave band. As shown in FIG. 1, the millimeter wave module includes a circuit board 11, a plurality of antenna modules 14 arranged on one side of the circuit board 11 configured to realize communication, a chip 13 arranged on the other side of the circuit board 11, and an external connecting end 12. The external connecting end 12 is, for example, a BTB connector, and the external connecting end 12 may connect the millimeter wave module to a circuit board element of a mobile phone, for example, to a main board 200 of the mobile phone.

Figure 2:
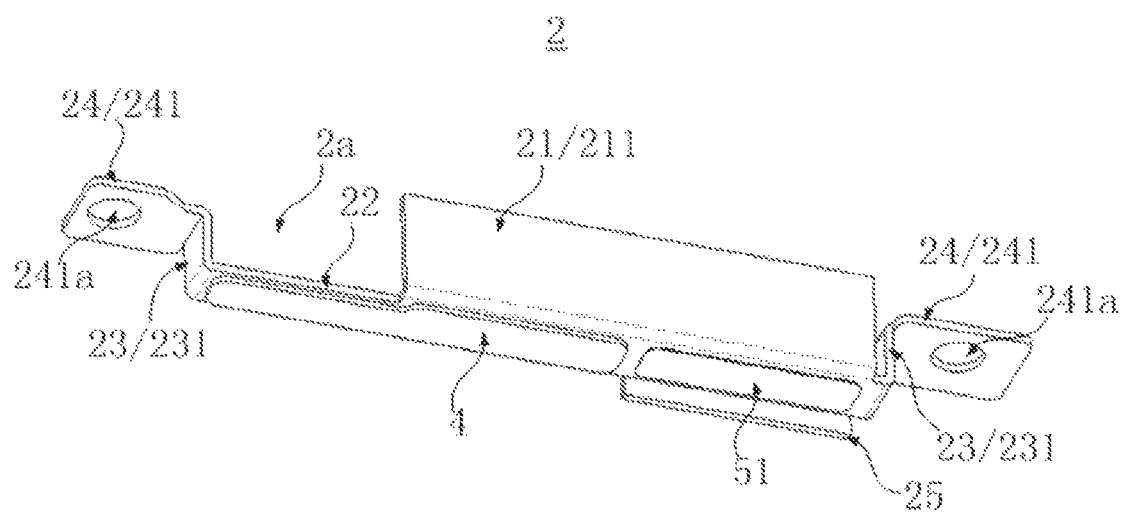
FIG. 2 is a schematic structural diagram of a bracket according to Embodiment 1 of this application.
Figure 3:
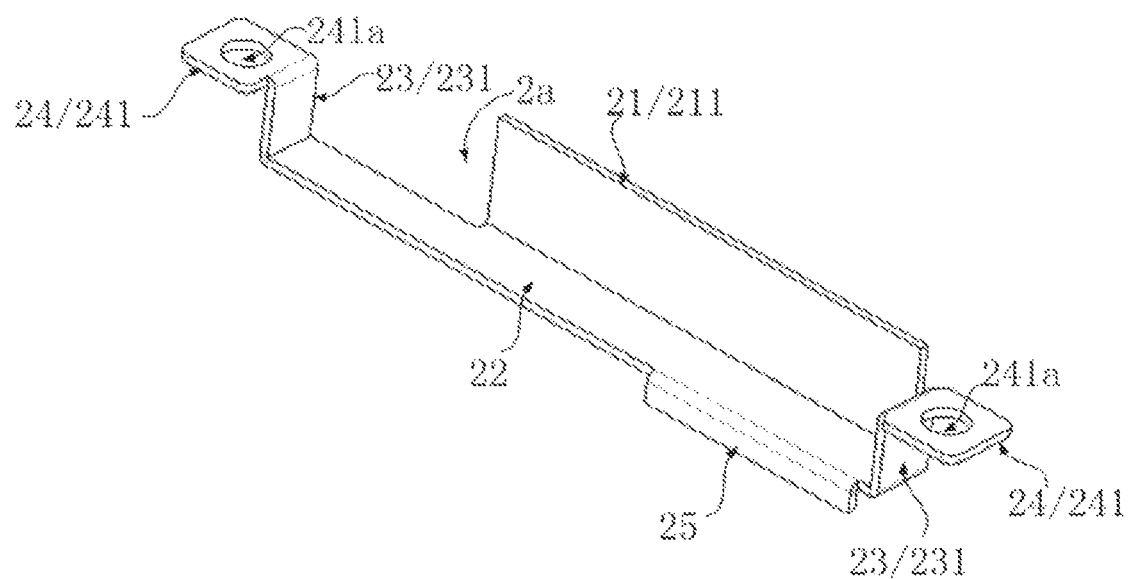
FIG. 3 is a schematic structural diagram of the bracket in FIG. 2 from another perspective.
Figure 4:
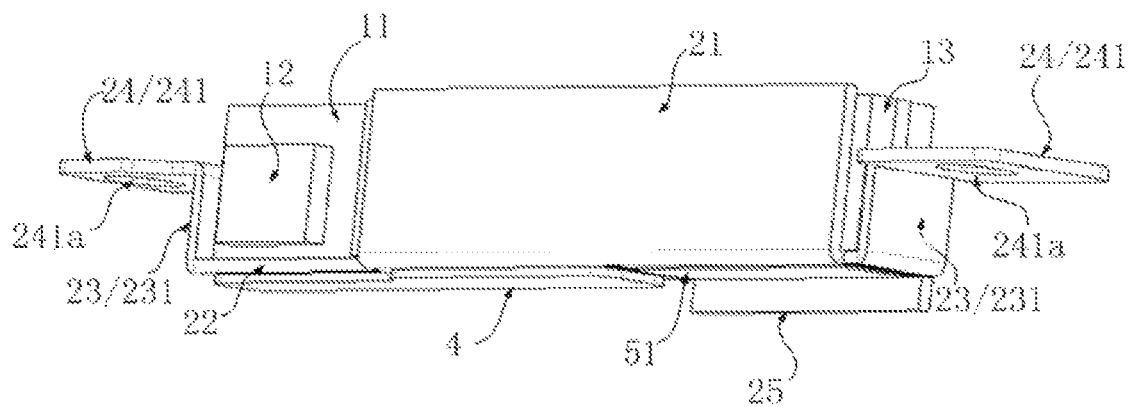
FIG. 4 is a schematic diagram of a module assembly formed by mounting the module in FIG. 1 on the bracket in FIG. 2.
Figure 5:
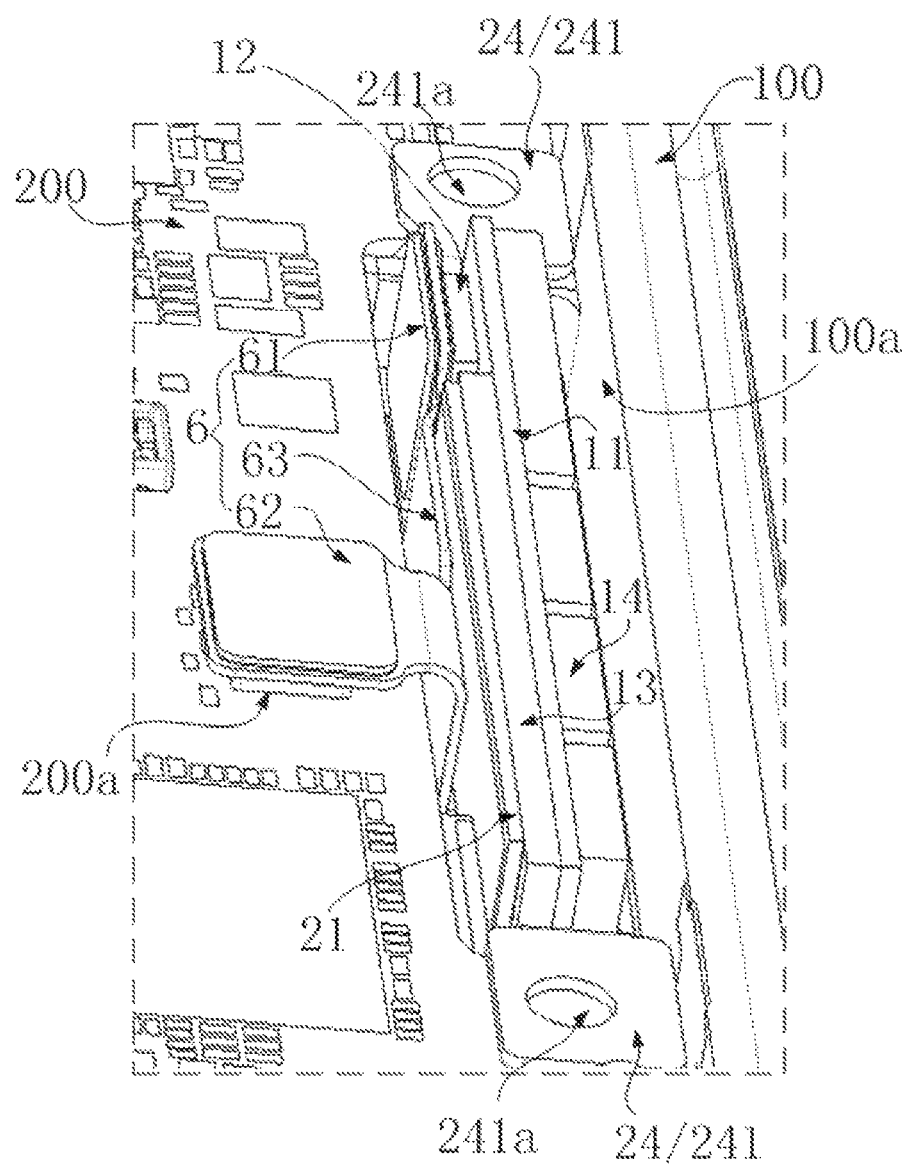
FIG. 5 is a schematic diagram of the module assembly in FIG. 4 arranged in a middle frame of a mobile phone.
Figure 6:
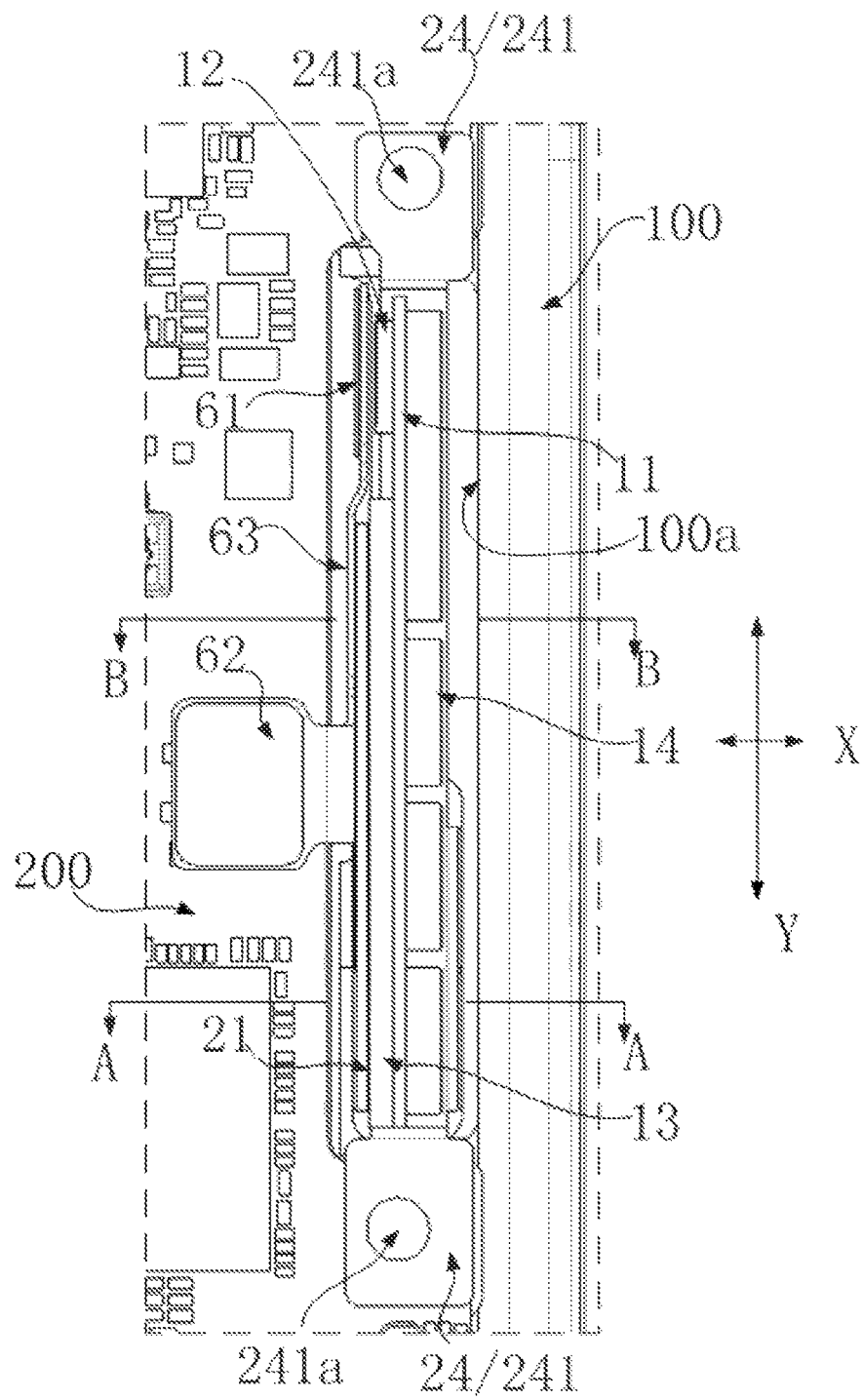
FIG. 6 is a top view of FIG. 5.

The module 1 may be mounted in a bracket 2, and the two are assembled into a module assembly. The module assembly is mounted into the electronic device. The module assembly in this embodiment of this application is specifically mounted in a middle frame 100 of the mobile phone, which may be understood with reference to FIG. 2 to FIG. 6. FIG. 2 is a schematic structural diagram of arranging a heat conductive pad 4 and a back adhesive 51 on the bracket 2 according to Embodiment 1. FIG. 3 is a schematic structural diagram of a bracket 2 in FIG. 2 from another perspective. FIG. 4 is a schematic diagram of a module assembly formed by mounting the module 1 in FIG. 1 on the bracket 2 in FIG. 2. FIG. 5 is a schematic diagram of the module assembly in FIG. 4 arranged in a middle frame 100 of a mobile phone. FIG. 6 is a top view of FIG. 5.

As shown in FIG. 2 and FIG. 3, two first limiting parts 23 arranged opposite to each other are arranged at two ends of the bracket 2 of the module assembly, a second limiting part 21 is arranged on one side of the bracket 2, and the two first limiting parts 23 and one second limiting part 21 are enclosed to form a mounting position for mounting the module 1. Specifically, the bracket 2 includes a bottom plate 22 and vertical plates 231 located at two ends of the bottom plate 22. The vertical plates 231 form the first limiting parts 23. A first flange 211 is arranged on only one side of the bottom plate 22, and the first flange 211 forms the second limiting part 21. During mounting, from the perspective of FIG. 4, the module 1 is arranged on the bottom plate 22, and one side of the module 1 is limited by the first flange 211 that is used as the second limiting part 21. As shown in FIG. 4, one side on which a chip 13 is arranged in the module 1 is limited by the first flange 211, and two ends of the module 1 are limited by the vertical plates 231 that are used as the first limiting parts 23.

The bracket 2 further includes fixing parts 24, where the fixing parts 24 are configured to fix the bracket 2 to the middle frame 100 of the mobile phone. In FIG. 3, edges of the vertical plates 231 far away from the bottom plate 22 extend in directions far away from the mounting position to form fixing flanges 241, and the fixing flanges 241 are used as the fixing parts 24. Connecting holes 241a are provided on the fixing flanges 241, and the bracket 2 may be fixed to the middle frame 100 of the mobile phone by inserting screws into the corresponding connecting holes 241a. Certainly, the fixing part 24 may also be arranged on another position of the bracket 2, for example, may be separately fixed to the bottom or a side edge of the bracket 2, which is mainly designed according to a mounting position of the module assembly in the mobile phone, to facilitate fastening. In this embodiment, the fixing flanges 241, the vertical plates 231, the bottom plate 22, and the first flange 211 are all integrally formed, which have better strength and are easy to process.

As shown in FIG. 5, during the mounting, the bracket 2 may be first fixed in the middle frame 100, and then the module 1 is mounted, or the bracket 2 and the module 1 may be assembled into the module assembly, and then the assembly may be integrally mounted in the middle frame 100.

Two first limiting parts 23 and one second limiting part 21 of the bracket 2 need to have a certain limiting effect on the module 1, to maintain the position stability of the module 1 on the bracket 2. A distance between the two first limiting parts 23, that is, a length of the bottom plate 22 is slightly longer than a length of the module 1. In consideration of factors such as a tolerance of the module and a processing tolerance of the bracket 2, for example, a gap may be 0.1 mm, the module 1 is mounted to the bracket 2 in a top-edge alignment manner, that is, the two ends of the module 1 and the first limiting parts 23 are zero-matched, and then the module 1 is fixed to the second limiting part 21 by using a back adhesive, so that it is convenient for mounting without damaging the module 1, and limiting is achieved. The bracket 2 is made of copper alloy (such as C1940 alloy), a carbon fiber, or other materials with certain strength, and such material may have better heat dissipation performance, to facilitate the module 1 in heat dissipation. The material of the bracket 2 is not limited as long as it meets strength requirements of mounting and protecting the module 1, and it is better to consider certain heat dissipation performance.

Still referring to FIG. 3, a length of the first flange 211 of the bracket 2 is less than a length of a corresponding side of the bottom plate 22, that is, the first flange 211 is not arranged on one side of the bottom plate 22 in an entire length direction. In this case, since the length of the first flange 211 is less than the length of one side of the bottom plate 22, the first flange 211 is connected to a vertical plate 231 at an end of the bottom plate 22, and there is a gap therebetween. The gap may be defined as a first notch 2a. With reference to FIG. 3 and FIG. 4, it is to be understood that, after the module 1 is mounted to the bracket 2, the first notch 2a corresponds to an external connecting end 12 of the module 1, so that the external connecting end 12 establishes a connection to an external element at a position of the first notch 2a. In other words, a position is reserved to avoid the external connecting end 12, to prevent the bracket 2 from interfering with connection of the external connecting end 12 and scratching the external connecting end 12.

As shown in FIG. 3, the first notch 2a is reserved between one end of the first flange 211 and a vertical plate 231 at one end of the bottom plate 22, and the other end of the first flange 211 and a vertical plate 231 at the other end of the bottom plate 22 may have a relatively small gap therebetween or may be connected to each other. In other words, in addition to reserving the necessary first notch 2a, the length of the first flange 211 may be as long as possible, to improve a capability of limiting the module 1. For example, the length of the first flange 211 may be exceed half of the length of the module 1, where the length of the module 1 is a size of the module 1 in an arrangement direction of a plurality of antenna modules 14 in FIG. 1. In this embodiment, the length of the module 1 is basically the same as the length of the bottom plate 22, to achieve zero matching with the vertical plates 231 at two ends as much as possible. For example, the length of the module 1 is slightly less than the length of the bottom plate 22. In this way, smooth assembly and a limiting effect of the vertical plates 231 at two ends after assembly may be ensured. Therefore, the length of the first flange 211 exceeds half of the length of the bottom plate 22 in this case. It may be understood that, the first notch 2a is not limited to be provided between the first flange 211 and one vertical plate 231, which may be designed according to a position of the external connecting end 12 on the module 1. For example, in a case that the external connecting end 12 is located in the middle of the module 1, the first flange 211 may reserve a corresponding notch in the middle. In another example, the module 1 may also arrange more external connecting ends 12, and the first flange 211 may also correspondingly provide a corresponding quantity of notches, or one notch may avoid all the external connecting ends 12.

In addition, a height of the first flange 211 may be set to be higher than half of a height of the module 1, to ensure that the module 1 is limited. A height direction herein is a depth direction of the mounting position formed by enclosing the first flange 211 and the vertical plates 231 at two ends. From the perspective of FIG. 6, an X direction shown in FIG. 6 is a width direction of the mobile phone, a Y direction is a length direction of the mobile phone, and the height is a size of the first flange 211 in a Z direction perpendicular to a paper direction. It may be seen that a height of at least one of the first limiting part 23 or the second limiting part 21 is higher than half of the height of the module 1. Certainly, it is preferable that the height of the first limiting part 23 and the second limiting part 21 is higher than half of the height of the module 1. The first flange 211 in FIG. 3 is set to a higher height. A height of the vertical plates 231 whose two ends are used as the first limiting parts 23 is less than that of the first flange 211. This is mainly because the fixing flanges 241 arranged by two vertical plates 231 and the middle frame 100 are limited by a fixed position when fixed. It may be seen that, according to structural design of the middle frame 100, the vertical plates 231 may be higher in a case that there is no interference and restriction. For example, the middle frame 100 may be higher than the module 1. Actually, the height of at least one of the first limiting part 23 and the second limiting part 21 is preferably higher than that of the module 1, for example, the height may exceed more than 0.15 mm. In this way, in consideration of the tolerance of the module 1 and the processing tolerance of the bracket 2, the module 1 may not protrude from the bracket 2 in a height direction, so that the bracket 2 may be better limited and protect the module 1 from being scratched during assembly. For the same reason, the height of the vertical plate 231 may also higher than half of the height of the module 1.

In addition, a certain floating height may be generated after the module 1 and the bracket 2 are assembled. After the module assembly is assembled into the middle frame 100 of the mobile phone, there may be a gap between a highest position of the module assembly and a battery cover 300, to avoid film printing on the battery cover 300 of the mobile phone. For example, the gap may be about 0.25 mm. A plug structure may further be arranged, and the plug structure is plugged between the module assembly and the battery cover 300 (shown in FIG. 7), to prevent the module assembly from being separated in the Z direction. A gap may also be reserved between the first flange 211 of the bracket 2 and the middle frame 100 or another component in the mobile phone in the X direction and Y direction, to meet requirements of assembly and positioning. For example, the gap may be about 0.1 mm.

Figure 7:
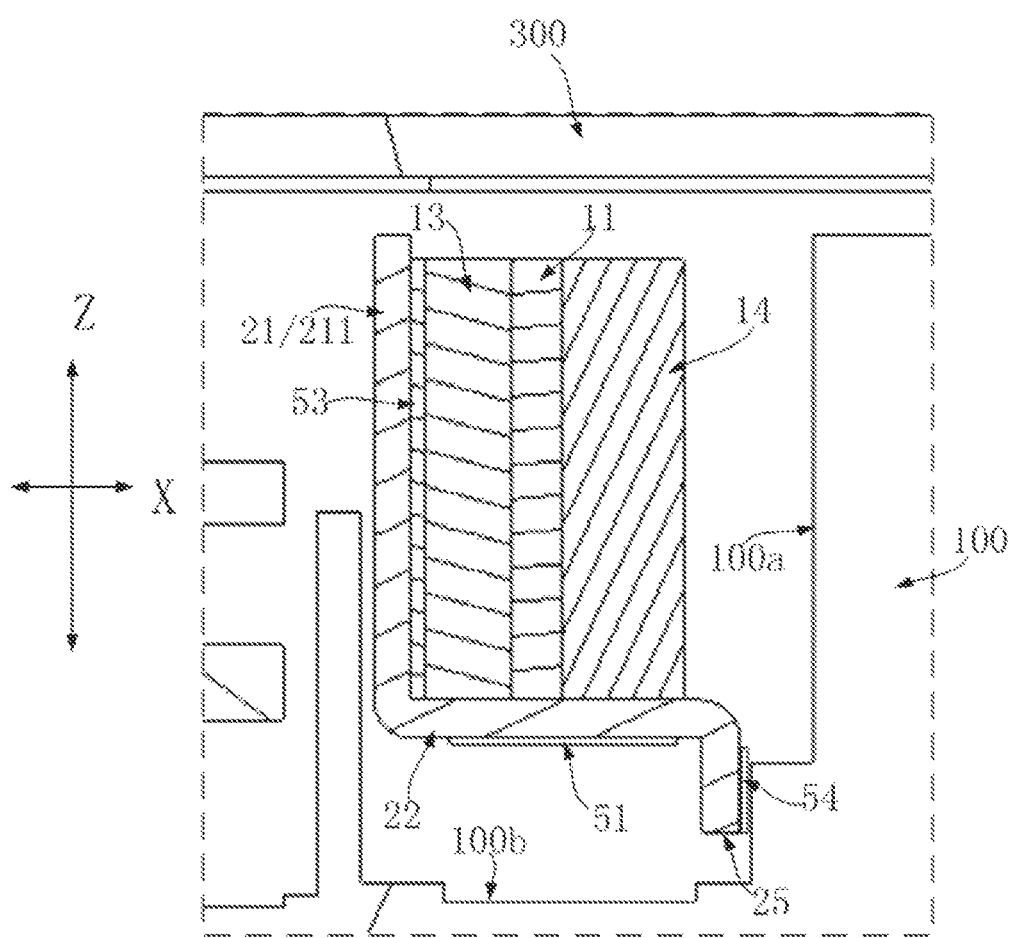
FIG. 7 is a cross-sectional view taken along a line A-A of FIG. 6.

Still referring to FIG. 3, in this embodiment of this application, a second flange 25 opposite to an extension direction of the first flange 211 is arranged on the other side of the bottom plate 22, and the second flange 25 and the bottom plate 22 may be integrated. With reference to FIG. 7, it may be understood that, FIG. 7 is a cross-sectional view taken along a line A-A of FIG. 6, which is sectioned at a position of the second flange 25. As shown in FIG. 7, the arranged second flange 25 may be configured to bond the middle frame 100. In FIG. 7, the second flange 25 is bonded to the middle frame 100 by using a back adhesive 54, and the second flange 25 may also abut against the middle frame 100 to play a role of limiting.

The middle frame 100 includes a bottom wall 100b and a side wall 100a surrounding the bottom wall 100b. With reference to FIG. 5 and FIG. 7, it may be understood that the module 1 in this embodiment is a millimeter wave module. In this embodiment, the first flange 211 is arranged on only one side of the bottom plate 22 of the bracket 2 and is used as the second limiting part 21, and the other side is empty and form an opening, so that two first limiting parts 23 and the first flange 212 used as the second limiting part 21 are enclosed to form a mounting position having an opening on one side, and the bracket 2 is assembled into the middle frame 100 and is located close to the side wall 100a of the middle frame 100. The first flange 211 is relatively far away from the side wall 100a of the middle frame 100, and one side of the opening of the bracket 2 where the first flange 211 is not arranged is close to the side wall 100a of the middle frame 100. During the mounting, the antenna module 14 of the module 1 may face one side of the opening of the bracket 2, the opening is provided in an external radiation region, and the antenna module 14 may be arranged close to the side wall 100a of the middle frame 100. In this case, the antenna module 14 is not limited and blocked by one side of the opening of the bracket 2, that is, the bracket 2 may not arrange a limiting part in the external radiation region of the module 1, which is more conducive to signal transmission between the millimeter wave module 1 and the outside. It may be understood that, in a case that the bracket 2 is not made of metal and the corresponding second limiting part 21 is made of material with good thermal conductivity and insulation performance, the second limiting parts 21 may also be arranged on two sides of the bracket 2. From the perspective of FIG. 6, a region in which the antenna module 14 in the module 1 faces the side wall 100a of the middle frame 100 and transmit signals to the right is the external radiation region.

Based on this, a second flange 25 opposite to an extension direction of the first flange 211 is arranged on one side of the bracket 2 where the first flange 211 is not arranged, and the second flange 25 is not located in the external radiation region of the module 1. In addition, the second flange 25 may abut against the side wall of the middle frame 100 to play a role of limiting and positioning, or may be fixed to the middle frame 100 by using the back adhesive 54, to further ensure the position stability of the module assembly in the middle frame 100.

As shown in FIG. 7, a back adhesive 51 may also be arranged on the bottom of the bottom plate 22 of the bracket 2, and the back adhesive 51 may be configured to bond an electronic element, that is, the bottom plate 22 of the bracket 2 may further used as a component for mounting the electronic element, thereby making full use of the bracket 2 of the module assembly and improving a space utilization rate.

Figure 8:
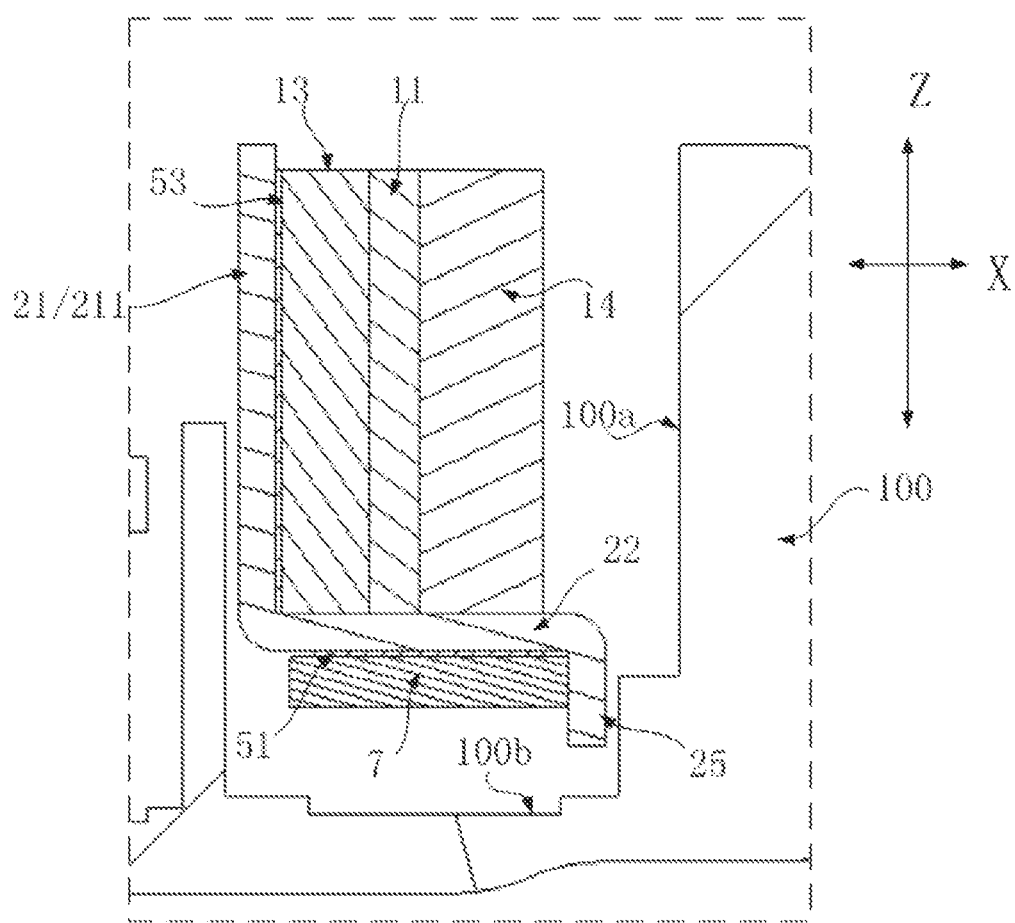
FIG. 8 is a schematic diagram of arranging a circuit board element on the bottom of the bracket in FIG. 7.

Still referring to FIG. 8, FIG. 8 is a schematic diagram of arranging a circuit board element 7 on the bottom of a bracket 2 in FIG. 7. A circuit board, that is, a main board 200 of the mobile phone is arranged in the middle frame 100 of the mobile phone in a case that the main board 200 has a limited area for use, the circuit board element 7 may be added, for example, some small circuit boards smaller than the main board 200, and the added circuit board element 7 may be fixed to the bottom of the bottom plate 22 of the bracket 2, for example, the circuit board element 7 may be bonded by using the back adhesive 51 or may be fastened to the bottom of the bracket 2 by using other fasteners. In FIG. 8, during arrangement of the second flange 25, the second flange 25 may further limit a position of the circuit board element 7, and may bond a side wall of the circuit board element 7, to improve position stability of the circuit board element 7.

Figure 9:
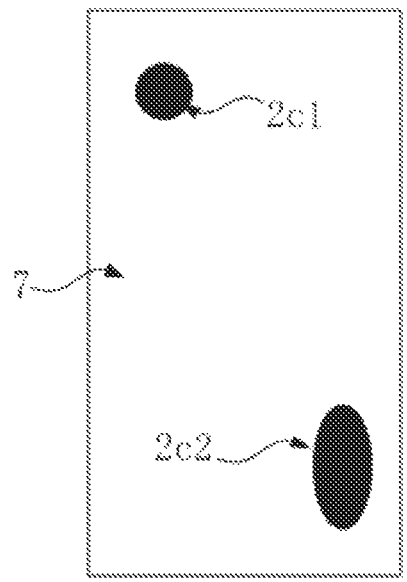
FIG. 9 is a schematic diagram of a circuit board element with a first limiting structure arranged the bottom of the bracket in FIG. 3.
Figure 10:
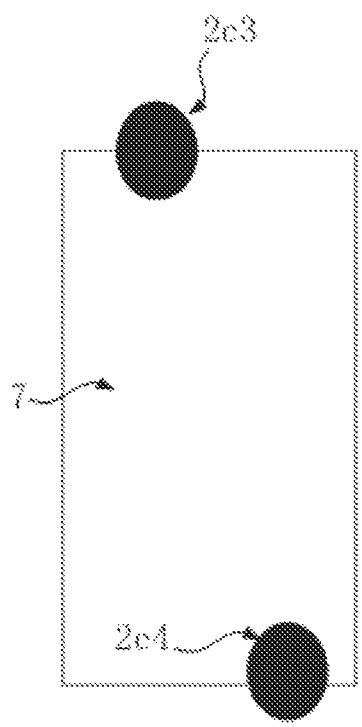
FIG. 10 is a schematic diagram of a circuit board element with a second limiting structure arranged the bottom of the bracket in FIG. 3.
Figure 11:
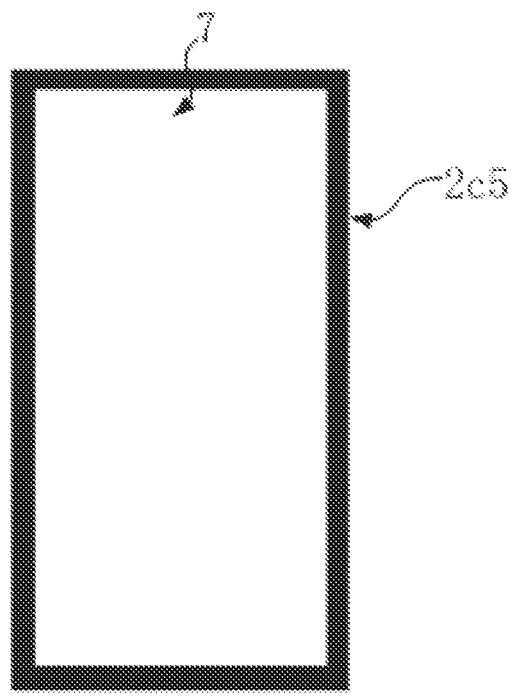
FIG. 11 is a schematic diagram of a circuit board element with a third limiting structure arranged the bottom of the bracket in FIG. 3.

With reference to FIG. 9 to FIG. 11, it may be understood that, FIG. 9 is a schematic diagram of a circuit board element 7 with a first limiting structure arranged the bottom of the bracket 2 in FIG. 3; FIG. 10 is a schematic diagram of a circuit board element 7 with a second limiting structure arranged the bottom of the bracket 2 in FIG. 3; and FIG. 11 is a schematic diagram of a circuit board element 7 with a third limiting structure arranged the bottom of the bracket 2 in FIG. 3.

In a case that the circuit board element 7 is arranged on the bottom of the bottom plate 22 of the bracket 2, a limiting structure may be arranged to limit circuit board element 7, to ensure the position stability of the circuit board element 7, where the limiting structure may be a protrusion. As shown in FIG. 9, protrusions may be arranged on the bottom of the bottom plate 22 of the bracket 2, and the circuit board element 7 may be provided with a corresponding hole structure. The protrusions may be a circular protrusion 2c1 and an elliptical protrusion 2c2 shown in FIG. 9, and the hole structure may be a circular hole or an elliptical hole provided in the circuit board element 7. The protrusions are inserted into the corresponding hole structure to limit the circuit board element 7 specifically in the X direction and the Y direction. As shown in FIG. 10, protrusions may also be arranged on the bottom of bottom plate 22 of the bracket 2, and the protrusions may be an elliptical protrusion 2c3 and an elliptical protrusion 2c4 shown in FIG. 10. A notch may be provided on an edge of the circuit board element 7, and a part of the protrusions may be clamped into the notch or may play a role of limiting. As shown in FIG. 11, a protrusion may also be arranged on the bottom of bottom plate 22 of the bracket 2, and the protrusion is a frame-type protrusion 2c5. The entire circuit board element 7 is embedded into the frame-type protrusion 2c5 to play a role of limiting. With reference to FIG. 8, it may be understood that, the circuit board element 7 may be bonded to the bottom of the bottom plate 22 of the bracket 2 by using the back adhesive 51 while being limited by the limiting structure, to ensure more stable and reliable connection of the circuit board element 7.

Figure 12:
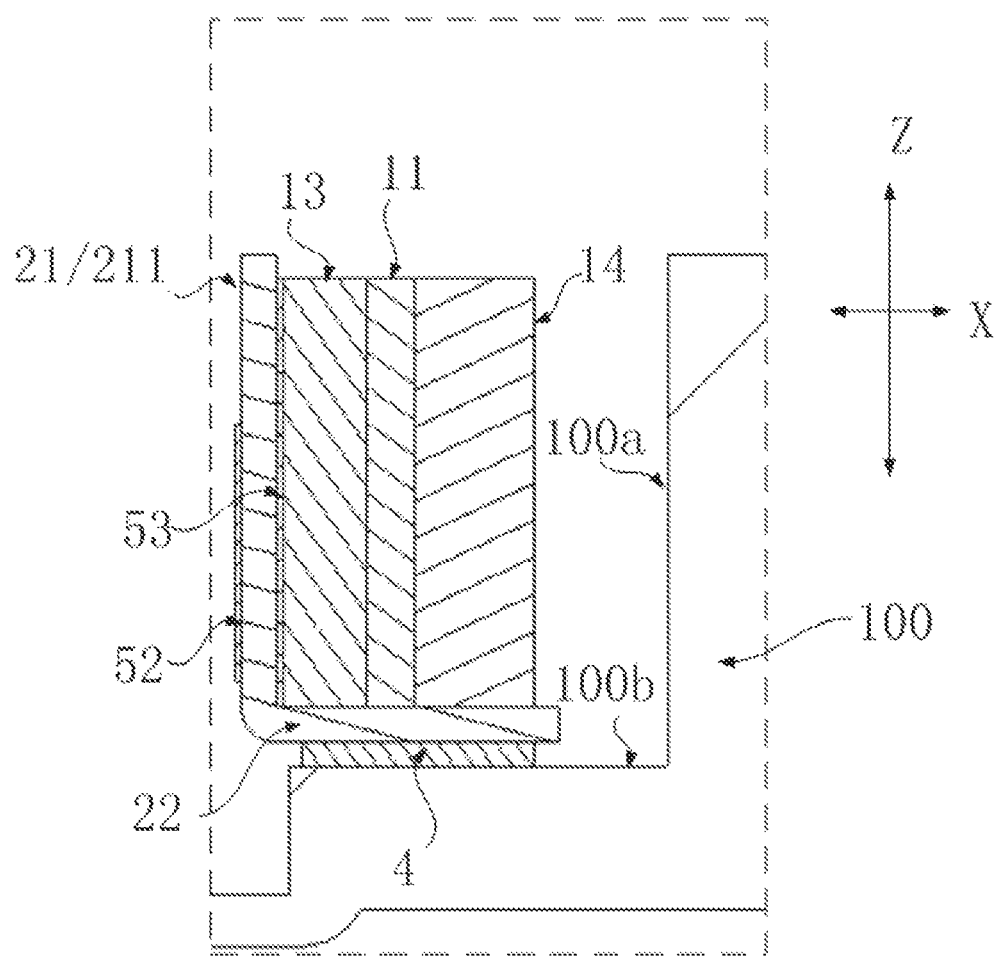
FIG. 12 is a cross-sectional view taken along a line B-B of FIG. 6.

Still referring to FIG. 2, it may be understood with reference to FIG. 12 that, FIG. 12 is a cross-sectional view taken along a line B-B of FIG. 6, which is sectioned at a position of a heat conductive pad 4.

In this embodiment, the heat conductive pad 4 may be arranged between the bottom of the bottom plate 22 of the bracket 2 and the bottom wall 100b of the middle frame 100, and the heat conductive pad 4 is arranged on the bottom. During the assembly, the bracket 2 may be assembled into the middle frame 100 of the mobile phone in the Z direction, so that the heat conductive pad 4 may not be scratched and may maintain good heat conduction performance. Heat dissipated by the module 1 may be transferred to the heat conductive pad 4 through the bottom plate 22 of the bracket 2, then transferred to the middle frame 100 through the heat conductive pad 4, and is finally dissipated to the outside, thereby thus playing a good role of heat dissipation. The material of the heat conductive pad 4 is not limited, which may be, for example, a heat conductive adhesive, a heat pipe, a graphite sheet, and the like. A thermally conductive gel may also be used as the heat conductive pad 4 in a case that a space in the Z direction is limited, that is, a gap between the bottom plate 22 and the bottom wall 100b of the middle frame 100 is relatively small.

As can be seen, in FIG. 7, the back adhesive 54 between the second flange and an inner wall of the middle frame 100 may also form the heat conductive pad. The back adhesive 54 may be a thermally conductive gel arranged between the second flange 25 and the inner wall of the middle frame 100 in a case that an X-direction gap between the second flange 25 and the inner wall of the middle frame 100 is relatively small, which may also play a role of heat conduction and facilitating in heat dissipation.

Figure 13:
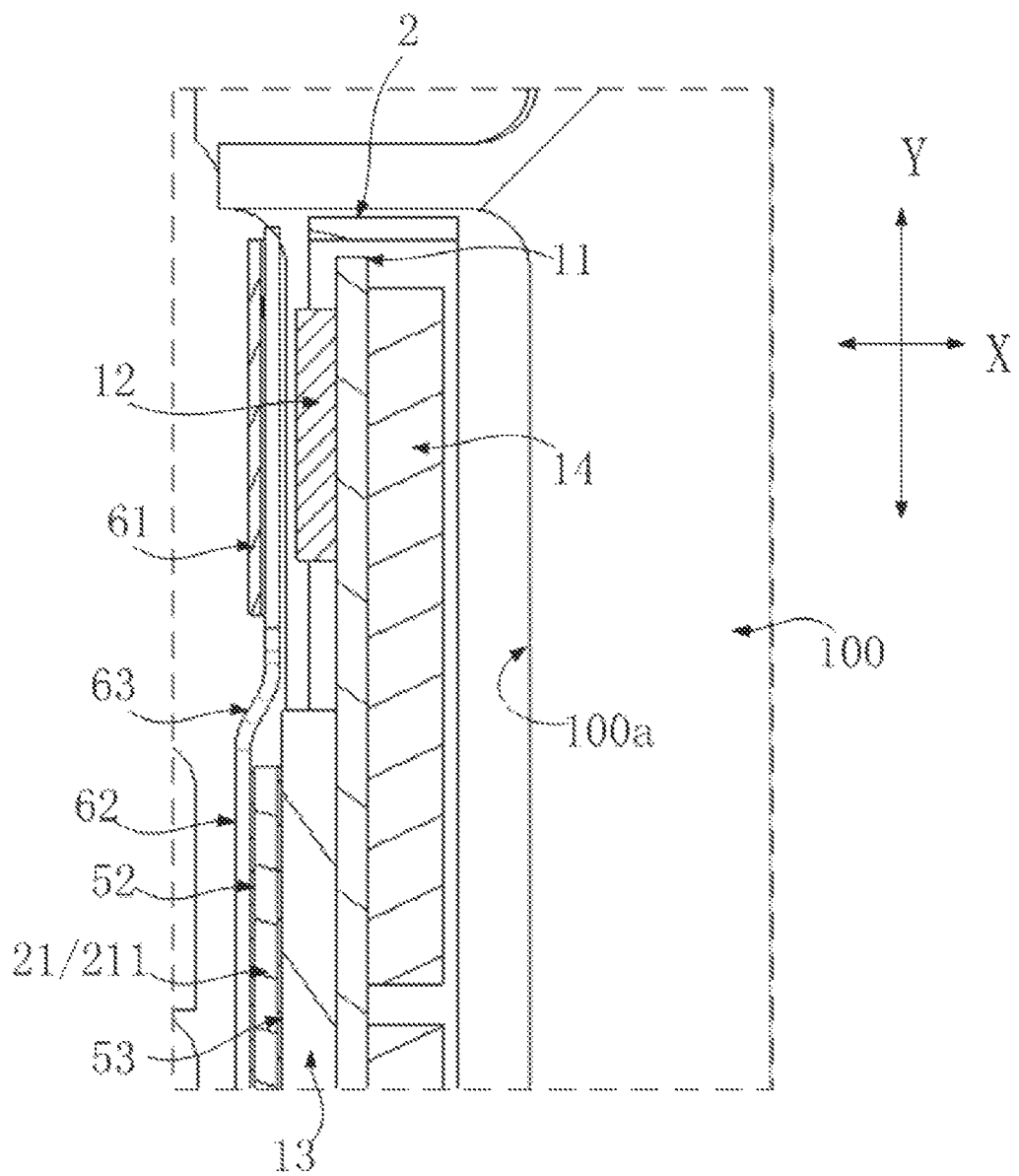
FIG. 13 is an enlarged view at a position of an external connecting end in FIG. 6.
Figure 14:
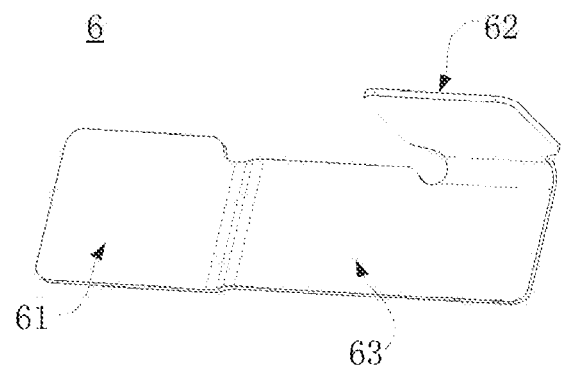
FIG. 14 is a schematic diagram of a connection structure in FIG. 6.

Referring to FIG. 6 and FIG. 13 again, FIG. 13 is an enlarged view at a position of an external connecting end 12 in FIG. 6; and FIG. 14 is a schematic diagram of a connection structure 6 in FIG. 6.

In this embodiment, the module assembly further includes a connection structure 6. The connection structure includes a main body portion 63, and a first connecting end 61 and a second connecting end 62 arranged on the main body portion 63. The first connecting end 61 is configured to connect the external connecting end 12 of the module 1, and the second connecting end 62 is configured to connect the electronic element of the electronic device, which may specifically be the main board 200 connected to the mobile phone in FIG. 6. The connection structure 6 may be a flexible printed circuit (FPC, Flexible Printed Circuit), and the first connecting end 61 and the second connecting end 62 are board to board (BTB, board to board) connectors at two ends of the FPC. The FPC is a flexible connector which can be deformed and may flexibly adapt to a spatial layout, so that the external connecting end 12 may be easily connected to the main board 200 of the mobile phone. It may be seen that the connection structure 6 is not limited to establishing a connection to the electronic element through BTB. For example, a component of the electronic device may arrange an elastic piece as the connecting end. The first connecting end 61 of the connection structure 6 may be directly exposed with copper to be connected to the elastic piece, or may establish a connection by using a conductive adhesive. This is not specifically limited in this embodiment. The connection structure 6 may be made of liquid crystal polymer (LPC, Liquid crystal polymer), polyimide (PI, Polyimide), modified polyimide (MPI, Modified Polyimide) or the like as long as a circuit arrangement function may be realized and a certain bending capability is provided.

As shown in FIG. 13, in this embodiment, the main body portion 63 of the connection structure 6 can be fixed to the second limiting part 21, and can be specifically bonded to an outer surface of the first flange 211 by using a back adhesive 52, where the outer surface is a side surface far away from the mounting position. An inner surface of the first flange 211 faces the chip 13 of the module 1, and may be bonded to the chip 13 by using a back adhesive 53, thereby further positioning the module 1 in the mounting position of the bracket 2. In addition, the first flange 211 faces the chip 13 of the module 1, and is directly contacted with the chip 13 or indirectly contacted by using the back adhesive 53. The back adhesive 53 may be made of an adhesive material such as a thermally conductive adhesive or a thermally conductive gel.

In this embodiment, the main body portion 63 of the connection structure 6 is bonded to the first flange 211 of the bracket 2, and the connection structure 6 may be fixed to the bracket 2. In this way, the first connecting end 61 and the second connecting end 62 do not interact with each other, connecting assembly and a connecting state of either one does not interfere with the other, which is beneficial to maintaining stability of the connection structure 6. For example, during connection, the first connecting end 61 of the connection structure 6 may be connected to the external connecting end 12 of the module 1 in the bracket 2, the main body portion 63 of the connection structure 6 may be bonded to the first flange 211, then the module assembly may be assembled into the middle frame 100 of the mobile phone, and finally the second connecting end 62 may be pulled to a position of a main board connecting end 200a of the main board 200 of the mobile phone shown in FIG. 6 to establish a connection to the main board connecting end 200a.

As can be seen from FIG. 13, the connection structure 6 is connected to the external connecting end 12 of the module 1 at the position of the first notch 2a of the bracket 2, and then extends along a side of the bracket 2, that is, in the Y direction, to a position close to the main board connecting end 200a of the main board 200 of the mobile phone. Then, the connection structure 6 is bent and connected to the main board 200, so that the second connecting end 62 is docked with the main board connecting end 200a. Such an assembly manner may be defined as a side-out scheme of the connection structure 6, after the first connecting end 61 of the connection structure 6 is connected to the external connecting end 12 of the module 1 in such a mounting manner, the connection structure 6 does not need to be bent immediately to establish a connection to the main board 200, but continues to extend by a certain distance along the side of the bracket 2 and then is bent, and the connection structure is also fixed to the first flange 211, so that the connection of the first connecting end 61 is more reliable, and the first connecting end 61 is not prone to be disconnected from the module 1. In addition, the connection structure 6 in such a mounting manner is not prone to be scratched. As shown in FIG. 13, arrangement of the connection structure 6 may be satisfied as long as an X-direction gap between the bracket 2 and the main board 200 is about 0.3 mm, and scratches on surrounding parts is not prone to occur. Certainly, a specific gap may be flexibly adjusted according to influence of tolerance and assembly.

As shown in FIG. 13, after the first connecting end 61 of the connection structure 6 is connected to the external connecting end 12 of the module 1, as it continues to extend along the side of the bracket 2, since there may be a certain X-direction between the first flange 211 and the first connecting end 61, the connection structure 6 needs to be slightly bent to extend to the outside of the first flange 211. In this case, the bracket 2 may be deburred near a bent position of the connection structure 6 to reduce or avoid possible scratches on the connection structure 6. In addition, an enough gap needs to be reserved between the bracket 2 and the bent position of the connection structure 6, for example, more than 0.5 mm, so as to reduce the risk of scratching.

It may be understood that, according to different mounting positions of the module 1 in the electronic device, a connection position of the external connecting end 12 of the module 1 and the main board 200 may change accordingly. In this case, the direction, the length, and the like of the connection structure 6 need to be adjusted accordingly, and a corresponding space may be reserved in the electronic device for the arrangement of the connection structure 6 as required.

Figure 15:
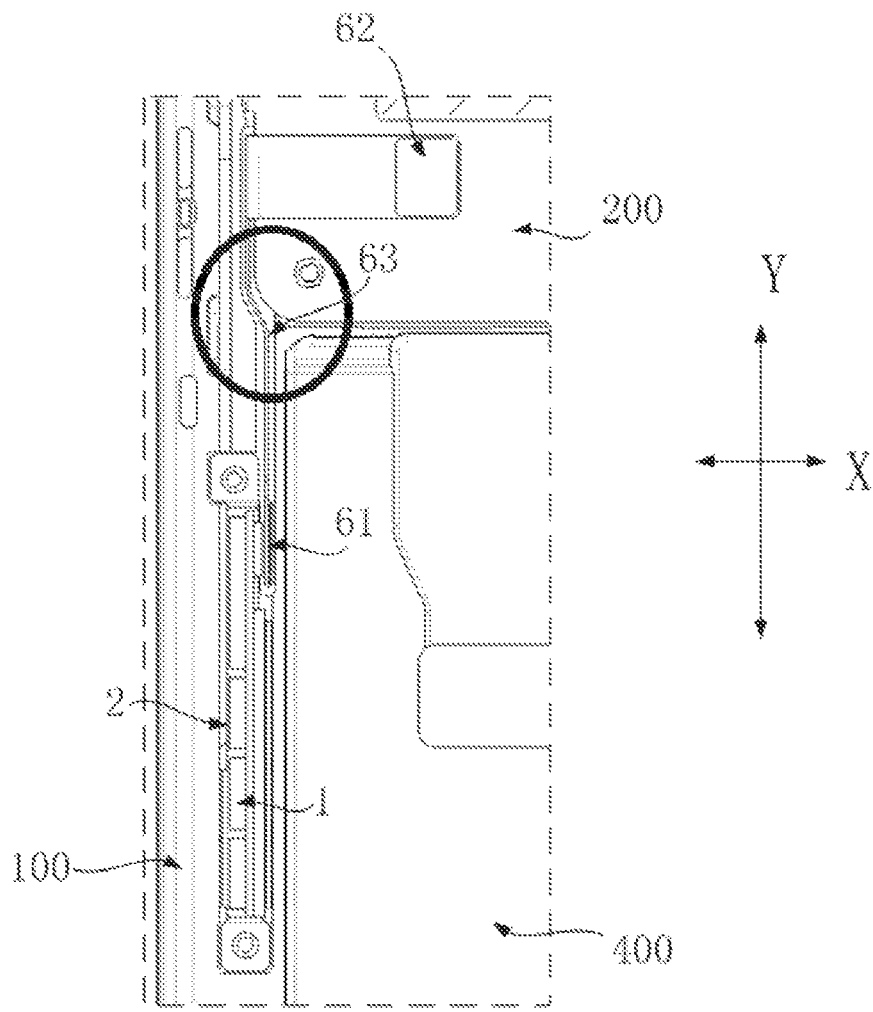
FIG. 15 is a schematic diagram of a module assembly shown in FIG. 4 arranged in a middle frame of a mobile phone and located on one side of a battery compartment.
Figure 16:
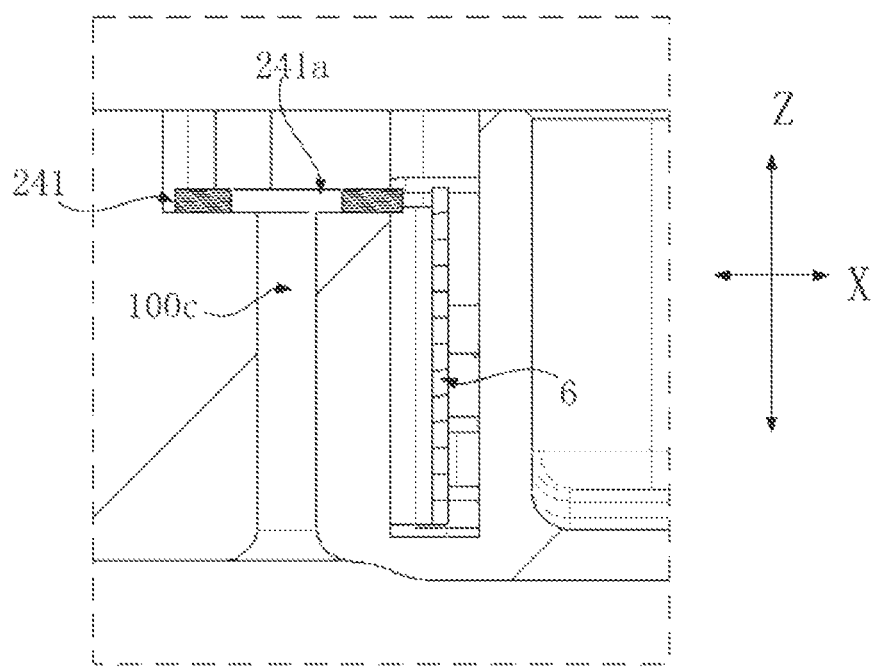
FIG. 16 is an X-direction cross-sectional view at a position of a first connecting end of a connection structure in FIG. 15.

As shown in FIG. 15 and FIG. 16, FIG. 15 is a schematic diagram of a module assembly shown in FIG. 4 arranged in a middle frame 100 of a mobile phone and located on one side of a battery compartment 400. FIG. 16 is an X-direction cross-sectional view at a position of a first connecting end 61 of a connection structure 6 in FIG. 15. FIG. 16 illustrates a screw hole 100c for inserting a screw, a screw insertion connecting hole 241a and the screw hole 100c fix the bracket 2 to the middle frame 100.

In FIG. 15, a certain spatial region is reserved from a region where the battery compartment 400 and the main board 200 are connected (that is, a region circled in FIG. 15). The connection structure 6 extends in the Y direction from the gap between the bracket 2 and the battery compartment 400 to a position at which the battery compartment 400 and the main board 200 are connected. Since a width of the main board 200 in the X direction is greater than a width of the battery compartment 400, the connection structure 6 needs to be bent at the connecting position, and a certain space is reserved at the connecting position to allow the connection structure 6 to be easily bent and extended to the side of the main board 200, and then folded and connected to the main board 200, so as to be connected to the main board connecting end 200a of the main board 200. In FIG. 15, a battery compartment on one side of the connection structure 6 may include a side wall of a certain thickness and strength as a retaining wall, so that the module assembly may be stably and reliably arranged between the side wall 100a of the middle frame 100 and a side wall of the battery compartment 400.

It is to be noted that, in this embodiment, the connection structure 6 adopts a side-out scheme. The connection structure 6 may also adopt a straight-out scheme, that is, after the first connecting end 61 of the connection structure 6 is connected to the external connecting end 12 of the module 1, the connection structure 6 extends in the Z direction and is bent to a surface of the main board 200 to be connected to the main board connecting end 200a at a corresponding position. Such a mounting manner requires a sufficient Z-direction space in consideration of a bending radius of the connection structure 6 and a distance between a bending position and a BTB connection position. As shown in FIG. 16, the bending radius of the connection structure 6 is very limited when the connection structure 6 is straight out, and consequently, the first connecting end 61 and the module 1 may be disconnected, and the connection structure 6 cannot be fixed by using the second limiting part 21 of the bracket 2. Certainly, the specific scheme of side out or straight out may be selected according to actual requirements.

Embodiment 2

Figure 17:
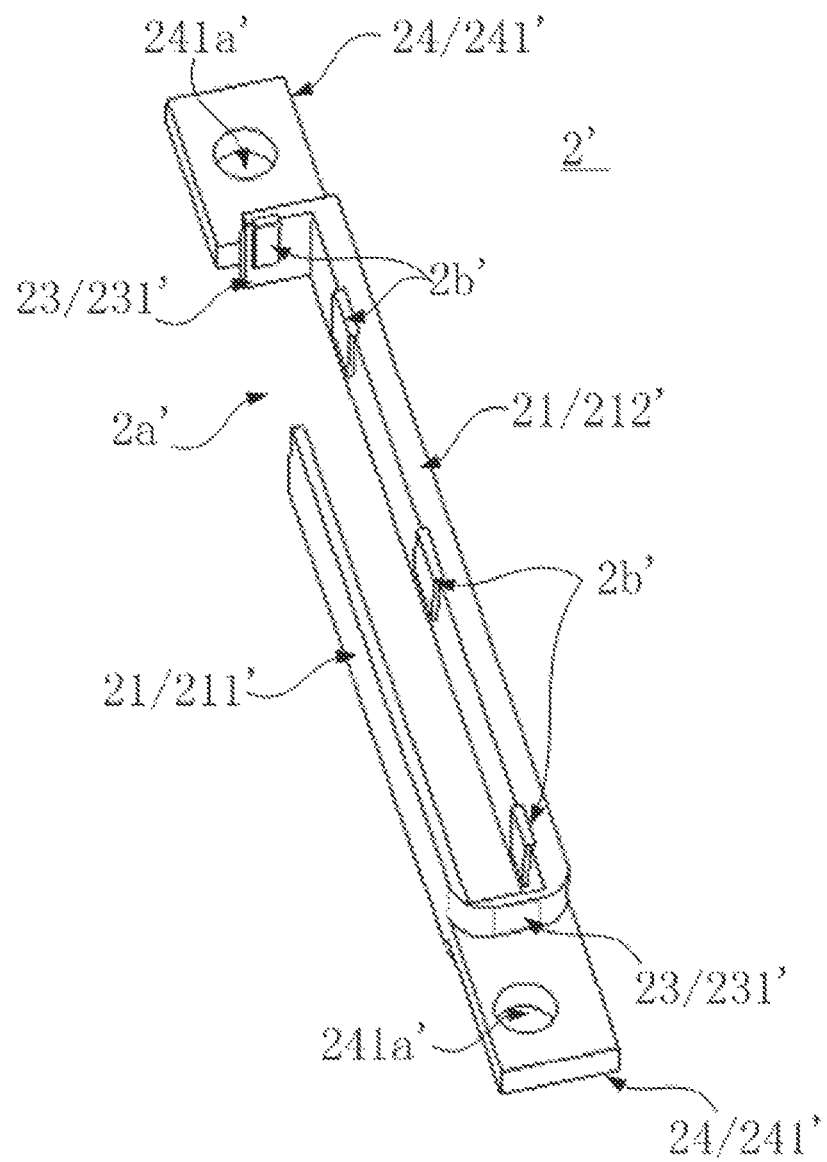
FIG. 17 is a schematic structural diagram of a bracket according to Embodiment 2 of this application.
Figure 18:
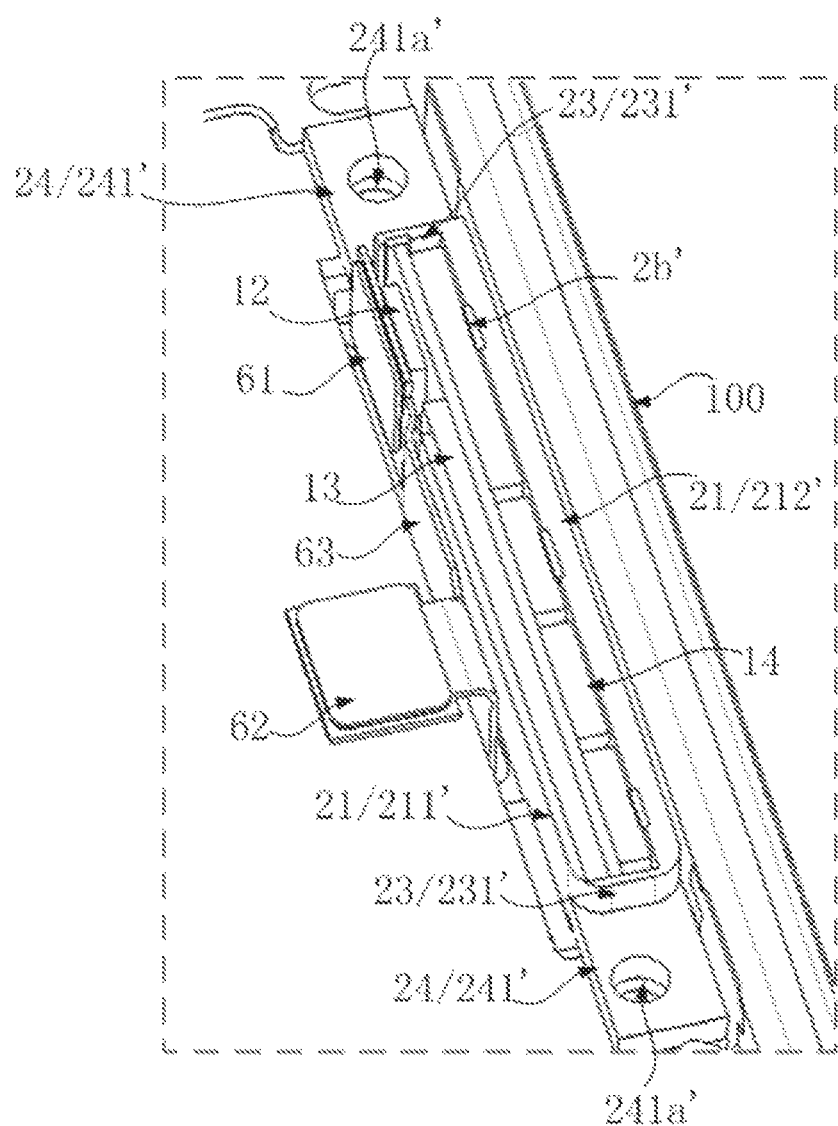
FIG. 18 is a schematic diagram of a module assembly mounted in a middle frame of a mobile phone according to Embodiment 2 of this application.
Figure 19:
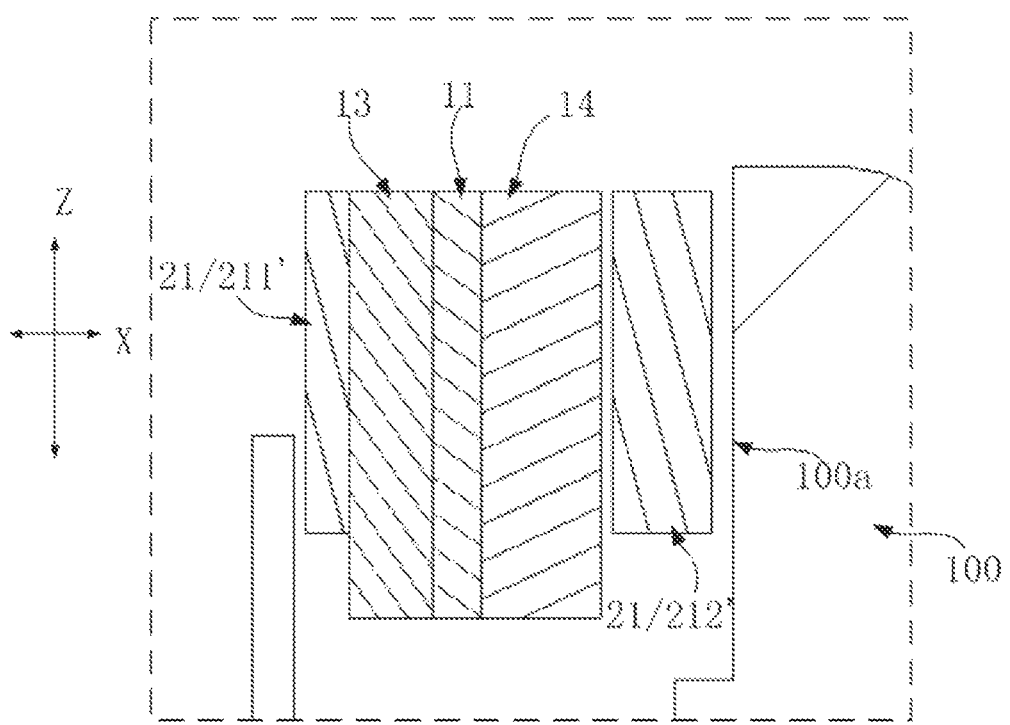
FIG. 19 is a cross-sectional view taken along an X-direction in FIG. 18.
Figure 20:
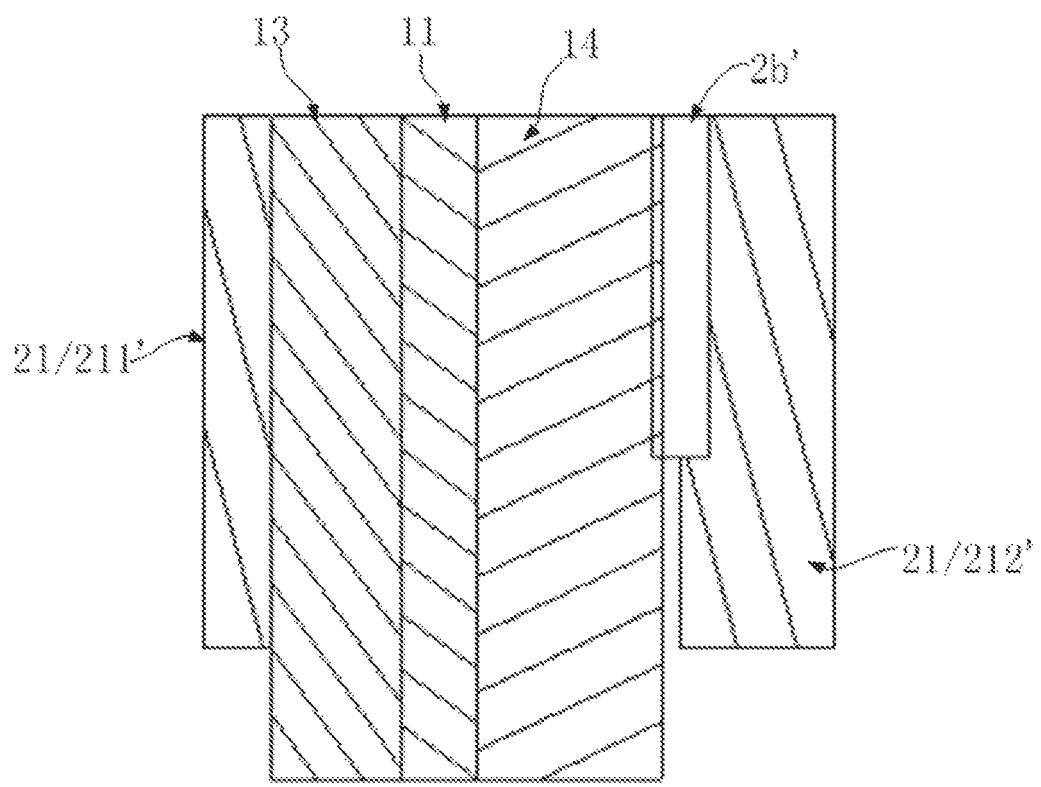
FIG. 20 is a cross-sectional view taken along an X-direction in FIG. 18.

Referring to FIG. 17 to FIG. 20, FIG. 17 is a schematic structural diagram of a bracket 2' according to Embodiment 2 of this application. FIG. 18 is a schematic diagram of a module assembly mounted in a middle frame 100 of a mobile phone according to Embodiment 2 of this application. FIG. 19 is a cross-sectional view taken along an X-direction in FIG. 18, where a sectional position corresponds to a position of the bracket 2' on which an elastic part 2b' is not arranged. FIG. 20 is a cross-sectional view taken along an X-direction in FIG. 18, where a sectional position corresponds to a position of the bracket 2' on which an elastic part 2b' is arranged.

As shown in FIG. 17, in Embodiment 2, the bracket 2' includes two side plates arranged opposite to each other and two end plates 231' arranged opposite to each other. In this case, the end plate 231' is the first limiting part 23, and the side plate is the second limiting part 21. The two side plates are a first side plate 211' and a second side plate 212'. The two side plates and the two end plates 231' are enclosed to form a mounting position for mounting the module 1, where the module 1 herein has the same structure as the module 1 in Embodiment 1. In this embodiment, an inner wall of at least one of the side plate or the end plate 231' is at least partially provided with an elastic part 2b' made of an elastic material in a protruding manner, so as to be in an interference fit with the module 1. In other words, an inner wall of at least one of the end plate 231', the first side plate 211', or the second side plate 212' includes the elastic part 2b'. As shown in FIG. 17, in this embodiment, the elastic part 2b' is only arranged on adjacent end plates 231' and the second side plates 212', to pressing the module 1 to be closer to the other end plates 231' and the first side plates 211', thereby facilitating in determining a position of the module 1. In addition, the elastic parts 2b' may be uniformly distributed along a circumferential direction of the bracket 2', thereby facilitating in uniformly pressing the module 1.

As shown in FIG. 20, when the module 1 is assembled to the bracket 2', the elastic part 2b' arranged in the bracket 2' may press a side wall of the module 1, specifically, press the antenna module 14 and the chip 13 of the module 1. The elastic part 2b' may not cause damage to the module 1 due to elastic properties and forms an interference fit with the module 1 based on an elastic pressing action, thereby positioning the module 1.

Similar to Embodiment 1, in Embodiment 2, a height of any one of the two side plates or the two end plates 231' of the bracket 2' may be at least higher than one half of the height of the module 1, so as to limit and protect the module 1. Certainly, in a case that the height of module 1 is relatively high, the height of the bracket 2' is not be too high to avoid affecting the assembly, for example, the height of the bracket 2' may be set to about 1.0 mm. In Embodiment 2, the two end plates 231', and the first side plates 211' and the second side plates 212' are also integrally formed. In addition, heights of the two end plates 231' and the two side plates may be processed to be the same. As shown in FIG. 17, fixing plates 241' are further arranged on the end plate 231', the fixing plates 241' and the end plates 231' may be integrally or separately formed, both fixing plates 241' are provided with connecting holes 241a' and may be fixed to the middle frame 100 of the mobile phone by using screws passing through the corresponding connecting holes 241a'.

It is to be noted that, the bracket 2, 2' in the embodiments of this application may also be directly formed in the middle frame 100, so that there is no need to arrange fixing parts, for example, a groove is provided in the middle frame 100, and a peripheral wall of the groove is used as the end plate and the side plate of the bracket 2'.

As shown in FIG. 17 and FIG. 18, a length of the first side plate 211' is less than that of the second side plate 212', and a second notch 2a' is formed between the first side plate 211' and an end plate 231'. The same as a purpose of arranging the first notch 2a in Embodiment 1, the second notch 2a' also reserves a space, to facilitate connection between the external connecting end 12 of the module 1 and the connection structure 6. After the external connecting end 12 of the module 1 is connected to the connection structure 6, the two form a connecting position. Sizes of the first notch 2a in the first embodiment and the second notch 2a' in the second embodiment in the Y direction are to be reserved with the connecting position by about 0.5 mm, that is, connection between the external connecting end 12 and the connection structure 6 is avoided, to avoid scratching. Different from the opening on one side of the mounting position in Embodiment 1, in this embodiment, the two end plates 231' and the two side plates of the bracket 2' form a circumferential nearly closed mounting position, and the bracket 2' may limit the module 1 in a circumferential direction except for a position of the second notch 2a'. In this way, limiting is reliable.

In addition, since the interference fit between the bracket 2' and the side wall of the module 1 achieves the limiting effect, the bottom of the bracket 2' may be empty, that is, a bottom plate is not arranged on the bracket 2', so that the module 1 is more convenient to mount, and the bracket 2' can be mounted from top to bottom or from bottom to top in the Z direction. After the bracket 2' in this embodiment is mounted in the middle frame 100 of the mobile phone, a certain gap needs to be reserved between the bracket 2' and the middle frame 100 of the mobile phone or another component in the mobile phone in the X direction and Y direction, to avoid scratching, for example, the gap may be set to about 0.1 mm.

It is to be noted that, in this embodiment, the two end plates 231' and the two side plates may be integrally molded, and the elastic part 2b' is made of soft plastic, which may be, for example, thermoplastic polyurethane (TPU, Thermoplastic Urethane). Other parts of the bracket 2' are made of hard material, for example, which may specifically be molded by performing a double-shot injection molding process, or may be molded by LIM (which is a liquid silicone process). The processed bracket 2' includes R angles at transition and edge positions of the first side plate 211', the second side plate 212', and the end plate 231', and a processed mold also has own mold R angles at non-R angle positions corresponding to the bracket 2', so that a surface of the bracket 2' formed by processing is smoother, and the connection structure 6 may be effectively prevented from being scratched. The strength and reliability of the bracket 2' may be ensured by integrally injection molding the hard plastic and the soft plastic, and a bracket 2' in a desired shape may be easily molded. In addition, one side of the bracket 2' mentioned in Embodiment 1 is provided with an opening on one side, to avoid an external radiation region of the antenna module 14 of the module 1. The bracket 2' in this embodiment is made of hard plastic and soft plastic. Compared with metal, it has limited influence on the function of the antenna module 14 of the module 1, that is, material with little or no influence on the communication performance may be selected as the material of the bracket 2'. In addition, the elastic part 2b' made of soft plastic of the bracket 2' may be in an interference limit with the module 1, and limiting requirements are considered. Moreover, the bracket 2' is made of hard plastic and soft plastic, which has a certain heat dissipation effect.

As can be seen, elastic parts 2b' need to be arranged on the bracket 2, which are specifically made of soft plastic, but the soft plastic and hard plastic are not limited to only two materials, and the bracket 2' may be made of two or more materials, where the soft plastic realizes elastic interference fit, and the hard plastic meets strength requirements of the bracket 2'.

Figure 21A:
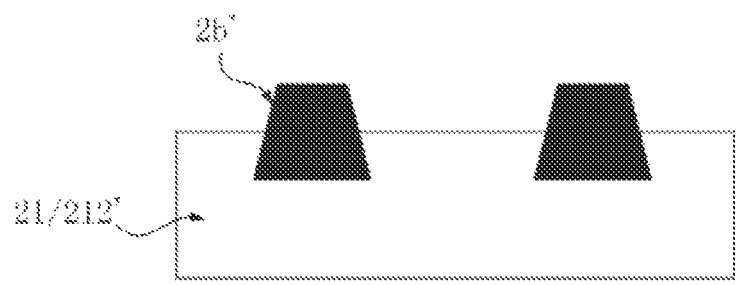
FIG. 21*a* is a first schematic structural diagram of arranging an elastic part on a second side plate of a bracket according to Embodiment 2.
Figure 21B:
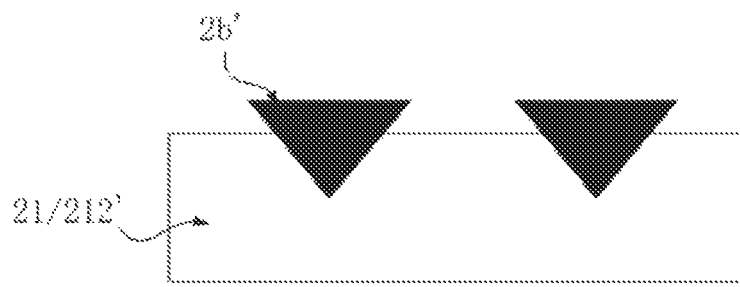
FIG. 21*b* is a second schematic structural diagram of arranging an elastic part on a second side plate of a bracket according to an embodiment 2.
Figure 21C:
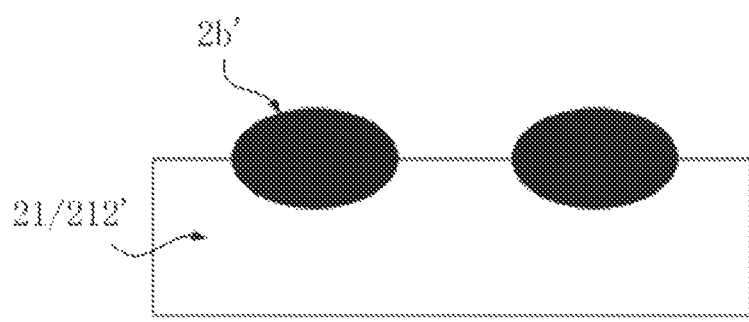
FIG. 21*c* is a third schematic structural diagram of arranging an elastic part on a second side plate of a bracket according to Embodiment 2.

As described above, the elastic parts 2b' can press the module 1, so that the module 1 is interference fitted in the bracket 2', and a specific structure form of the elastic parts 2b' is not limited in this embodiment. As shown in FIG. 21a to FIG. 21c, FIG. 21a to FIG. 21c are three schematic structural diagrams of arranging elastic parts 2b' on a second side plates 212' of a bracket 2' according to Embodiment 2. A first structure of the elastic part 2b' shown in FIG. 21a is in a trapezoidal elastic part 2b', a second elastic part 2b' shown in FIG. 21b is in a triangular shape, and a third elastic part 2b' shown in FIG. 21c is in an elliptical shape.

Figure 22:
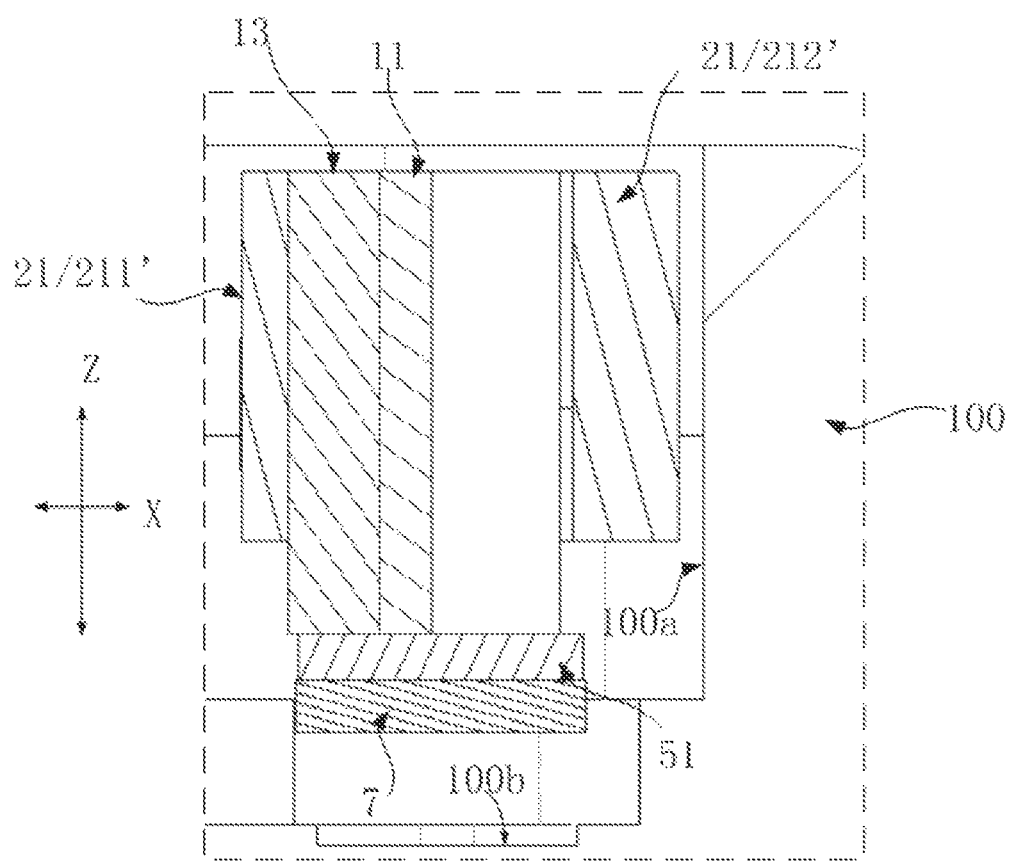
FIG. 22 is a cross-sectional view taken along an X-direction at a position of a circuit board element in FIG. 18.

In addition, as shown in FIG. 22, FIG. 22 is a cross-sectional view taken along an X-direction at a position of a circuit board element 7 in FIG. 18.

Similar to Embodiment 1, in Embodiment 2, a circuit board element 7 may also be arranged on the bottom of the module assembly. In this embodiment, the bottom of the bracket 2' is empty and no bottom plate 22 is arranged. In this case, the circuit board element 7 may be fixed to the bottom of the module 1, which may be, for example, bonded to the module 1 by using the back adhesive 51.

Figure 23:
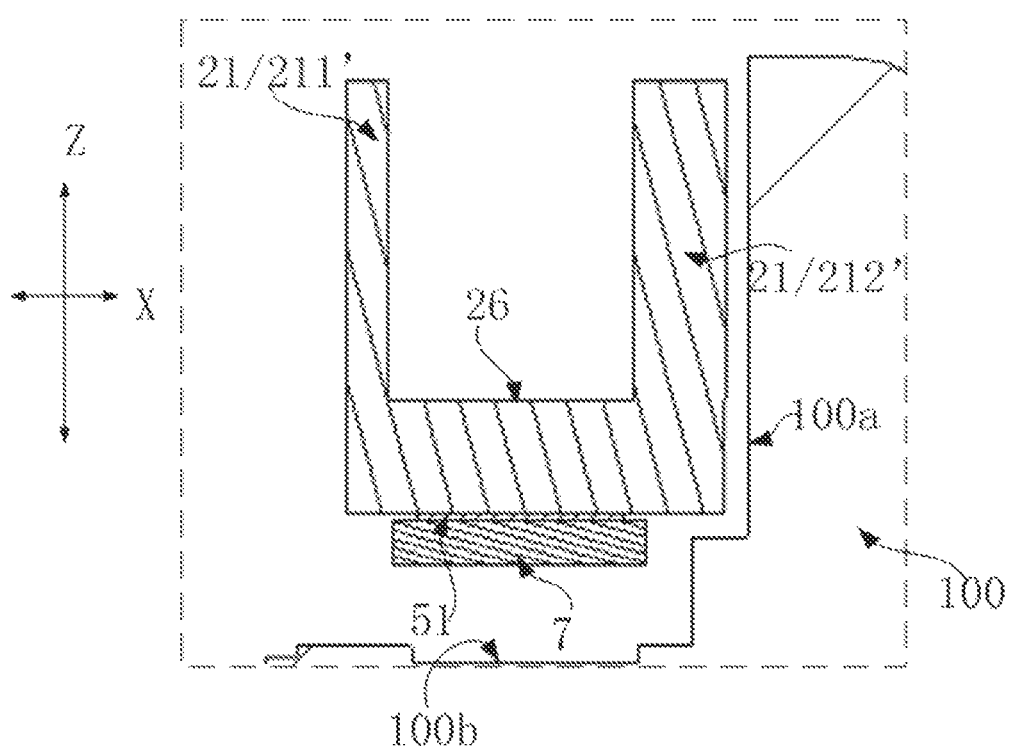
FIG. 23 is a schematic diagram of another manner of arranging a circuit board element on the bottom of a bracket according to Embodiment 2.

As shown in FIG. 23, FIG. 23 is a schematic diagram of another manner of arranging a circuit board element 7 on the bottom of a bracket 2' according to Embodiment 2.

A bottom plate may also be arranged on the bracket 2' in Embodiment 2 or a fixed structure may be arranged on the bottom. The fixing structure is, for example, an extension plate 26 extending from an edge of the first side plate 211' to the second side plate 212', and the extension plate 26 may cover part or all of the bottom of the bracket 2', which is equivalent to arranging a bottom plate. In this case, the circuit board element 7 may be fixed to the fixing structure on the bottom of the bracket 2' by using a back adhesive or other fasteners, and a limiting structure as shown in Embodiment 1 may be arranged on the bottom of the fixing structure, to limit the circuit board element 7. Details are not described herein again. As can be seen, if a fixing structure is arranged on the bracket 2', it is obvious that the module 1 needs to be mounted from a side opposite to the bottom plate.

Figure 24:
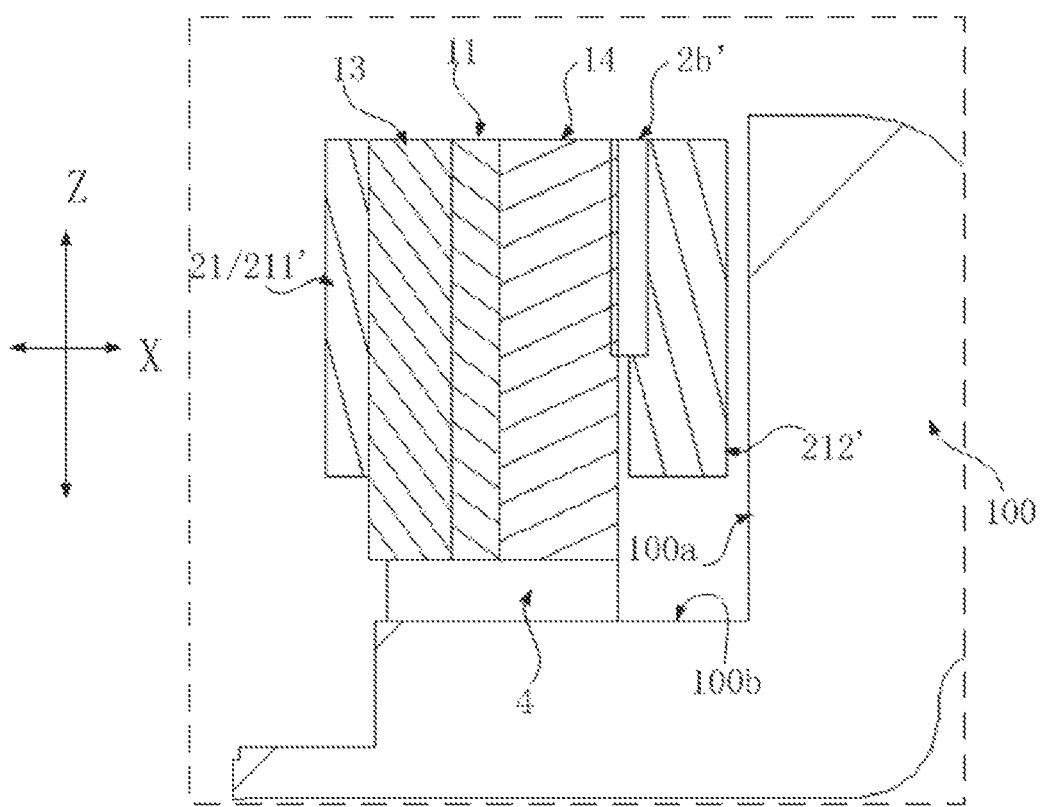
FIG. 24 is a cross-sectional view taken along an X-direction at a position of a heat conductive pad in FIG. 18.

In addition, as shown in FIG. 24, FIG. 24 is a cross-sectional view taken along an X-direction at a position of a heat conductive pad 4 in FIG. 18.

Similar to Embodiment 1, in Embodiment 2, a heat conductive pad 4 may be provided on the bottom of the bracket 2', and the heat conductive pad 4 may be directly arranged between the bottom of the module 1 and the bottom wall 100b of the middle frame 100 as shown in FIG. 24, where the heat conductive pad 4 is in direct contact with the bottom of the module 1, which has better heat conduction and heat dissipation effects. In this case, when the module 1 is installed, the bottom of the module 1 is protruded from the bracket 2', so that a gap between the module 1 and the bottom wall 100b of the middle frame 100 is smaller. The heat conductive pad 4 is arranged without interference from the bottom of the first side plate 211' and the second side plate 212' of the bracket 2', so that the heat conductive pad 4 may be fully contacted with the module 1. Certainly, when the bottom of the two side plates of the bracket 2' protrudes from the module 1, the heat conductive pad 4 may also be arranged between the support 2' and the bottom wall 100b of the middle frame 100, for example, if the bracket 2' is protruded about 0.5 mm or more, or the circuit board element 7 may be fixed with a fixing structure as shown in FIG. 23, and a bottom plate or another structure may be arranged on bottom of the bracket 2'. In this case, the heat conductive pad 4 may also be arranged between the bottom plate or another structure and the middle frame 100.

In Embodiment 2, a same connection structure 6 as that in Embodiment 1 is also arranged. The connection structure 6 may be mounted in a side-out or straight-out manner, and the main body portion 63 of the connection structure 6 may be fixed to the second side plate 212' that is used as the second limiting part 21, which may be understood with reference to Embodiment 1. Details are not described herein again.

In the foregoing two embodiments, the description is made mainly by using an example in which the module 1 is a millimeter wave module. As can be seen, the bracket provided in this embodiment of this application may also configured to mount a module 1 of another type. The module 1 is not limited to the antenna module 14, the chip 13, and the external connecting end 12 which can transmit signals, and any module structure needs to be assembled into the electronic device may be mounted by using the bracket provided in this embodiment of this application. The bracket mainly aims to limit and protect the module. When the structure of the module changes accordingly, the size and shape of a mounting position formed by the bracket may be adjusted accordingly.

In addition, in the foregoing embodiments, the bracket 2 and the middle frame 100 of the mobile phone are separately arranged. As can be seen, the bracket 2 may also be integrally formed in the middle frame 100 of the mobile phone, and particularly, for an interference fit scheme in Embodiment 2, it is easy to be integrally formed in the middle frame 100. In this case, the middle frame 100 may be formed into a groove, the groove is used as the mounting position of the module 1, the middle frame 100 made of metal is usually used as a hard part, and then an elastic part made of elastic material is arranged on a groove wall, and the elastic part may be injection molded with the middle frame 100, or the elastic part may be embedded in the groove wall provided by the middle frame 100.

Finally, the above-mentioned embodiment is described by using an example in which the module assembly is mounted to the middle frame 100 of the mobile phone. As can be seen, when the module 1 needs to be mounted to another electronic device, the bracket provided in the embodiments of this application may also be used for mounting. The electronic device may also be, for example, a mobile terminal such as a mobile phone, a wearable device, a vehicle-mounted device, an augmented reality (augmented reality, AR)/virtual reality (virtual reality, VR) device, an ultra-mobile personal computer (ultra-mobile personal computer, UMPC), a netbook, a personal digital assistant (personal digital assistant, PDA), or may be a professional shooting device such as a digital camera, an SLR camera/micro-single camera, a motion camera, a pan/tilt camera, an unmanned aerial vehicle as long as it is an electronic device with a module. This is not specifically limited in this scheme.

The principles and implementations of this application are described through specific examples, and the descriptions of the embodiments are merely intended to help understand the methods and core ideas of this application. It should be noted that a person of ordinary skill in the art may further make several improvements and modifications to this application without departing from the principle of this application. These improvements and modifications also fall within the protection scope of the claims of this application.

What is claimed is:

1. A bracket for a module, comprising:
   two first limiting parts arranged opposite to each other at two ends of the bracket;
   a second limiting part arranged on at least one side of the bracket, wherein the two first limiting parts and the second limiting part are enclosed to form a mounting position for mounting the module;
   two side plates arranged opposite to each other, wherein the second limiting part comprises one or both of the side plates; and
   two end plates arranged opposite to each other, wherein the first limiting parts comprise one or both of the end plates, wherein the two side plates and the two end plates are enclosed to form the mounting position, and wherein an inner wall of at least one of the side plate or the end plate at least partially comprises an elastic part made of an elastic material in a protruding manner, so as to be in an interference fit with the module,
   wherein the end plates and the side plates are integrally formed through injection molding, the elastic part is made of soft plastic, and other parts of the end plate and the side plate are made of hard plastic,
   wherein the bracket is configured to be separately arranged on an electronic device, and either a) the bracket comprises fixing parts configured to fix the bracket to the electronic device, or b) the bracket is integrally formed on a housing of the electronic device, and
   wherein the fixing parts are fixed or integrally arranged on the first limiting parts, and the fixing parts include connecting holes configured for fixing to the electronic device.

2. The bracket of claim 1, further comprising:
   a bottom plate;
   vertical plates at two ends of the bottom plate, wherein the vertical plates form the first limiting parts; and
   a first flange arranged on only one side of the bottom plate, wherein the first flange forms the second limiting part.

3. The bracket of claim 2, further comprising a second flange opposite to an extension direction of the first flange arranged on the other side of the bottom plate, wherein the second flange is configured to bond to a circuit board element or an electronic device.

4. The bracket of claim 2, wherein the bracket is made of copper alloy or carbon fiber.

5. The bracket of claim 1, wherein the module comprises an external connecting end, and the bracket includes a notch to expose the external connecting end.

6. A module assembly, comprising:
a module comprising an external connecting end;
a bracket for mounting the module, comprising:
two first limiting parts arranged opposite to each other at two ends of the bracket; and
a second limiting part arranged on at least one side of the bracket,
wherein the two first limiting parts and the second limiting part are enclosed to form a mounting position for mounting the module; and
a connection structure, comprising:
a main body portion bonded to the second limiting part; and
a first connecting end and a second connecting end that are arranged on the main body portion, wherein the first connecting end is configured to be connected to the external connecting end of the module, and the second connecting end is configured to be connected to an electronic element of an electronic device,
wherein at least one of a heat conductive pad or a circuit board element is fixed on a bottom of the module assembly,
wherein a limiting structure is arranged on the bottom of the bracket, and the limiting structure is configured to prevent the circuit board element from being separated from the bottom of the bracket, and
wherein either a) the limiting structure is a protrusion or concave part arranged on the bottom of the bracket, and the circuit board element comprises a corresponding concave part or protrusion, or b) the limiting structure is a concave part arranged on the bottom of the bracket, and the circuit board element is configured to be embedded into the concave part.

7. The module assembly of claim 6, wherein a bottom plate is arranged on a bottom of the bracket, and a bottom of the module is bonded to the bottom plate.

8. The module assembly of claim 6, wherein the module is bonded to at least one of the first limiting part or the second limiting part.

9. The module assembly of claim 8, wherein the module comprises a chip, wherein the chip is bonded to the second limiting part.

10. The module assembly of claim 6, wherein the module comprises an antenna module configured to communicate, the second limiting part is arranged on only one side of the bracket, the other side of the bracket comprises an opening, and the antenna module faces the opening.

11. The module assembly of claim 6, wherein the module is a millimeter wave module.

12. An electronic device, comprising:
a housing; and
a module assembly, comprising:
a module comprising an external connecting end;
a bracket for mounting the module, comprising:
two first limiting parts arranged opposite to each other at two ends of the bracket; and
a second limiting part arranged on at least one side of the bracket,
wherein the two first limiting parts and the second limiting part are enclosed to form a mounting position for mounting the module; and
a connection structure, comprising:
a main body portion bonded to the second limiting part; and
a first connecting end and a second connecting end that are arranged on the main body portion, wherein the first connecting end is configured to be connected to the external connecting end of the module, and the second connecting end is configured to be connected to an electronic element of an electronic device,
wherein a circuit board element is fixed on a bottom of the module assembly,
wherein a limiting structure is arranged on the bottom of the bracket, and the limiting structure is configured to prevent the circuit board element from being separated from the bottom of the bracket, and
wherein either a) the limiting structure is a protrusion or concave part arranged on the bottom of the bracket, and the circuit board element comprises a corresponding concave part or protrusion, or b) the limiting structure is a concave part arranged on the bottom of the bracket, and the circuit board element is configured to be embedded into the concave part.

13. The electronic device of claim 12, wherein the electronic device is a mobile phone, and the module assembly is arranged in a middle frame of the mobile phone.

14. The electronic device of claim 13, wherein a heat conductive pad is arranged between the bottom of the module assembly and a bottom wall of the middle frame.

15. The electronic device of claim 12, wherein a bottom plate is arranged on a bottom of the bracket, and a bottom of the module is bonded to the bottom plate.

16. The electronic device of claim 12, wherein the module is bonded to at least one of the first limiting part or the second limiting part.

17. The electronic device of claim 16, wherein the module comprises a chip, wherein the chip is bonded to the second limiting part.

18. The electronic device of claim 12, wherein the module comprises an antenna module configured to communicate, the second limiting part is arranged on only one side of the bracket, the other side of the bracket comprises an opening, and the antenna module faces the opening.

19. The electronic device of claim 12, wherein the module is a millimeter wave module.

20. The electronic device of claim 12, wherein the bracket is integrally formed on the housing of the electronic device.

* * * * *